(12) United States Patent
Zhang et al.

(10) Patent No.: US 12,301,126 B2
(45) Date of Patent: May 13, 2025

(54) SYSTEMS AND METHODS FOR DETECTION AND CONTROL RELATED TO CHARGING

(71) Applicant: ON-BRIGHT ELECTRONICS (SHANGHAI) CO., LTD., Shanghai (CN)

(72) Inventors: Yunchao Zhang, Shanghai (CN); Chao Yao, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/227,952

(22) Filed: Jul. 30, 2023

(65) Prior Publication Data

US 2023/0378882 A1 Nov. 23, 2023

Related U.S. Application Data

(63) Continuation of application No. 17/370,407, filed on Jul. 8, 2021, now Pat. No. 11,764,699.

(30) Foreign Application Priority Data

Jul. 9, 2020 (CN) .......................... 202010654990.6

(51) Int. Cl.
*H02M 3/335* (2006.01)
*H02M 1/00* (2006.01)

(52) U.S. Cl.
CPC ..... *H02M 3/33592* (2013.01); *H02M 1/0032* (2021.05)

(58) Field of Classification Search
CPC ......... H02M 3/33592; H02M 3/33576; H02M 3/33569; H02M 3/33507; H02M 1/0032
See application file for complete search history.

(56) References Cited

U.S. PATENT DOCUMENTS

| | | |
|---|---|---|
| 10,090,770 B2 | 10/2018 | Langeslag et al. |
| 10,396,571 B2 | 8/2019 | Rana et al. |
| (Continued) | | |

FOREIGN PATENT DOCUMENTS

| | | |
|---|---|---|
| CN | 104039053 A | 9/2014 |
| CN | 1558541 A | 12/2014 |
| (Continued) | | |

OTHER PUBLICATIONS

Office Action received for Chinese Patent Application No. 202010654990.6, mailed on Nov. 1, 2023, 14 pages (5 pages of English Translation and 9 pages of Original Document).

(Continued)

*Primary Examiner* — Alex Torres-Rivera
(74) *Attorney, Agent, or Firm* — Faegre Drinker Biddle & Reath LLP

(57) ABSTRACT

Controller and method for charging one or more loads. For example, the controller for charging one or more loads includes: a controller terminal configured to be biased at a first voltage related to a second voltage of a secondary winding of a power converter, the power converter further including a primary winding coupled to the secondary winding, the power converter being configured to, if the power converter is not unplugged from a voltage supply for an AC input voltage, receive the AC input voltage represented by the second voltage and output an output power to the one or more loads; and a voltage detector configured to: process information associated with the first voltage; and determine whether the AC input voltage is in a first voltage state or in a second voltage state based at least in part on the first voltage.

44 Claims, 12 Drawing Sheets

(56) References Cited

U.S. PATENT DOCUMENTS

| | | | |
|---|---|---|---|
| 10,651,753 B1* | 5/2020 | Khamesra | H02M 7/06 |
| 11,764,699 B2 | 9/2023 | Zhang et al. | |
| 2014/0085941 A1* | 3/2014 | Li | H02M 3/33523 363/21.12 |
| 2016/0308452 A1* | 10/2016 | Motoki | H02M 3/33523 |
| 2017/0229877 A1 | 8/2017 | Zhang | |
| 2019/0149056 A1* | 5/2019 | Zheng | H02M 1/32 363/21.13 |
| 2020/0112265 A1* | 4/2020 | Hara | H02M 1/32 |
| 2021/0091654 A1 | 3/2021 | Rajesh et al. | |
| 2021/0143725 A1 | 5/2021 | Deng et al. | |
| 2022/0014108 A1 | 1/2022 | Zhang et al. | |

FOREIGN PATENT DOCUMENTS

| | | |
|---|---|---|
| CN | 103227559 B | 5/2017 |
| CN | 207625446 U | 7/2018 |
| CN | 104283444 B | 2/2019 |
| CN | 109792202 A | 5/2019 |
| CN | 110021976 A | 7/2019 |
| CN | 111092543 A | 5/2020 |
| EP | 3249780 B1 | 7/2019 |
| JP | H 05308730 A | 11/1992 |
| JP | 2003-244865 A | 8/2003 |
| JP | 5621314 B2 | 11/2014 |
| KR | 1999-0001696 A | 1/1999 |
| TW | M561363 U | 6/2018 |
| TW | I631801 B | 8/2018 |
| WO | 2015/053206 A1 | 4/2015 |

OTHER PUBLICATIONS

Taiwan Intellectual Property Office, Office Action mailed Feb. 23, 2021, in Application No. 109128641.

China Patent Office, Office Action mailed May 23, 2024, in Application No. 202010654990.6.

* cited by examiner

SYSTEMS AND METHODS FOR DETECTION AND CONTROL RELATED TO CHARGING

1. CROSS-REFERENCES TO RELATED APPLICATIONS

This application is a continuation of U.S. patent application Ser. No. 17/370,407, filed Jul. 8, 2021, which claims priority to Chinese Patent Application No. 202010654990.6, filed Jul. 9, 2020, both of the above applications being incorporated by reference herein for all purposes.

2. BACKGROUND OF THE INVENTION

Certain embodiments of the present invention are directed to circuits. More particularly, some embodiments of the invention provide systems and methods for detection. Merely by way of example, some embodiments of the invention have been applied to charging one or more loads by flyback switching power supply systems. But it would be recognized that the invention has a much broader range of applicability.

With the increasing popularity of portable electronic devices, switching power supply systems have become more widely used for fast charging of these devices. FIG. 1 is a simplified diagram showing a conventional flyback switching power supply system used as an alternating current (AC) to direct current (DC) fast charging system. The flyback switching power supply system 100 (e.g., a power converter) includes a transformer 102 (e.g., T1) including a primary winding 104 and a secondary winding 106, a primary-side power switch 112 (e.g., a transistor M1), a capacitor 114, a resistor 116, a diode 122, a capacitor 124, and a rectifier 132 (e.g., a bridge rectifier).

As shown in FIG. 1, the rectifier 132 (e.g., a bridge rectifier) receives an alternating current (AC) voltage 130 from a voltage supply (e.g., an AC power supply). The rectifier 132 (e.g., a bridge rectifier) is coupled to the capacitor 114 and provides an input voltage 134 (e.g., $V_{bulk}$) to one terminal of the primary winding 104. The primary winding 104 also includes another terminal that is connected to a drain terminal of the primary-side power switch 112 (e.g., a transistor M1), which also includes a gate terminal and a source terminal. The source terminal of the primary-side power switch 112 (e.g., a transistor M1) is connected to one terminal of the resistor 116, which includes another terminal biased to a ground voltage on the primary side of the flyback switching power supply system 100. The gate terminal of the primary-side power switch 112 (e.g., a transistor M1) receives a drive signal 182, which closes or opens the primary-side power switch 112 (e.g., turns on or turns off the transistor M1). The drive signal 182 is a pulse-width-modulation (PWM) signal. If the drive signal 182 is at a logic high level, the primary-side power switch 112 is closed (e.g., the transistor M1 being turned on). If the drive signal 182 is at a logic low level, the primary-side power switch 112 is open (e.g., the transistor M1 being turned off).

The primary winding 104 is coupled to the secondary winding 106. One terminal of the secondary winding 106 is coupled to a cathode of the diode 122 and biased at a voltage 184 (e.g., $V_D$), and another terminal of the secondary winding 106 is coupled to a terminal of the capacitor 124. The capacitor 124 includes another terminal that is connected to an anode of the diode 122 and biased to a ground voltage on the secondary side of the flyback switching power supply system 100. A current 186 (e.g., $I_{sec}$) flows out of the secondary winding 106, and the capacitor 124 provides an output voltage 192 (e.g., $V_o$) to a load 190 (e.g., $R_o$). For example, the load 190 is a device including one or more batteries that need to be charged by the flyback switching power supply system 100 (e.g., a power converter). When the primary-side power switch 112 (e.g., a transistor M1) is turned on, the primary winding 104 stores energy, but when the primary-side power switch 112 (e.g., a transistor M1) is turned off, the primary winding 104 transfers the stored energy to the secondary winding 106. The secondary winding 106 undergoes the demagnetization process and provides energy the load 190 (e.g., $R_o$).

As shown in FIG. 1, the flyback switching power supply system 100 (e.g., a power converter) is used as an AC to DC fast charging system for the load 190 (e.g., $R_o$). Hence it is highly desirable to improve the techniques related to fast charging systems.

3. BRIEF SUMMARY OF THE INVENTION

Certain embodiments of the present invention are directed to circuits. More particularly, some embodiments of the invention provide systems and methods for detection. Merely by way of example, some embodiments of the invention have been applied to charging one or more loads by flyback switching power supply systems. But it would be recognized that the invention has a much broader range of applicability.

According to some embodiments, a controller for charging one or more loads includes: a controller terminal configured to be biased at a first voltage related to a second voltage of a secondary winding of a power converter, the power converter further including a primary winding coupled to the secondary winding, the power converter being configured to, if the power converter is not unplugged from a voltage supply for an AC input voltage, receive the AC input voltage represented by the second voltage and output an output power to the one or more loads; and a voltage detector configured to: process information associated with the first voltage; and determine whether the AC input voltage is in a first voltage state or in a second voltage state based at least in part on the first voltage; wherein the controller is configured to: if the AC input voltage is determined to be in the first voltage state, cause the power converter to set the output power at a first power level; if the AC input voltage is determined in the second voltage state, cause the power converter to set the output power at a second power level; wherein: the first voltage state and the second voltage state are different; and the first power level and the second power level are different.

According to certain embodiments, a method for charging one or more loads includes: receiving a first voltage related to a second voltage of a secondary winding of a power converter, the power converter further including a primary winding coupled to the secondary winding, the power converter being configured to, if the power converter is not unplugged from a voltage supply for an AC input voltage, receive the AC input voltage represented by the second voltage and output an output power to the one or more loads; processing information associated with the first voltage; determining whether the AC input voltage is in a first voltage state or in a second voltage state based at least in part on the first voltage; if the AC input voltage is determined to be in the first voltage state, causing the power converter to set the output power at a first power level; if the AC input voltage is determined in the second voltage state, causing the power converter to set the output power at a second power level;

wherein: the first voltage state and the second voltage state are different; and the first power level and the second power level are different.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for detection. Merely by way of example, some embodiments of the invention have been applied to charging one or more loads by flyback switching power supply systems. But it would be recognized that the invention has a much broader range of applicability.

Figure 1:
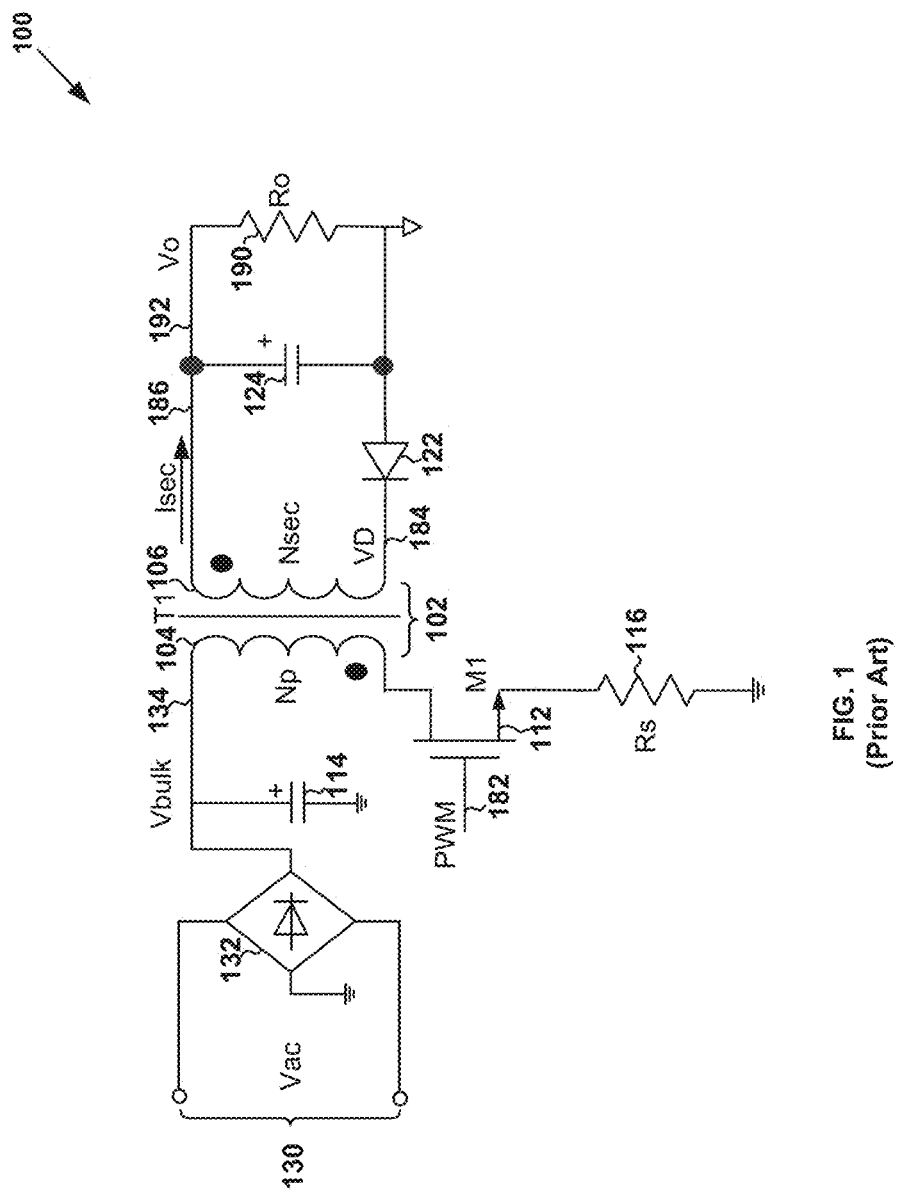
FIG. 1 is a simplified diagram showing a conventional flyback switching power supply system used as an alternating current (AC) to direct current (DC) fast charging system.
Figure 2:
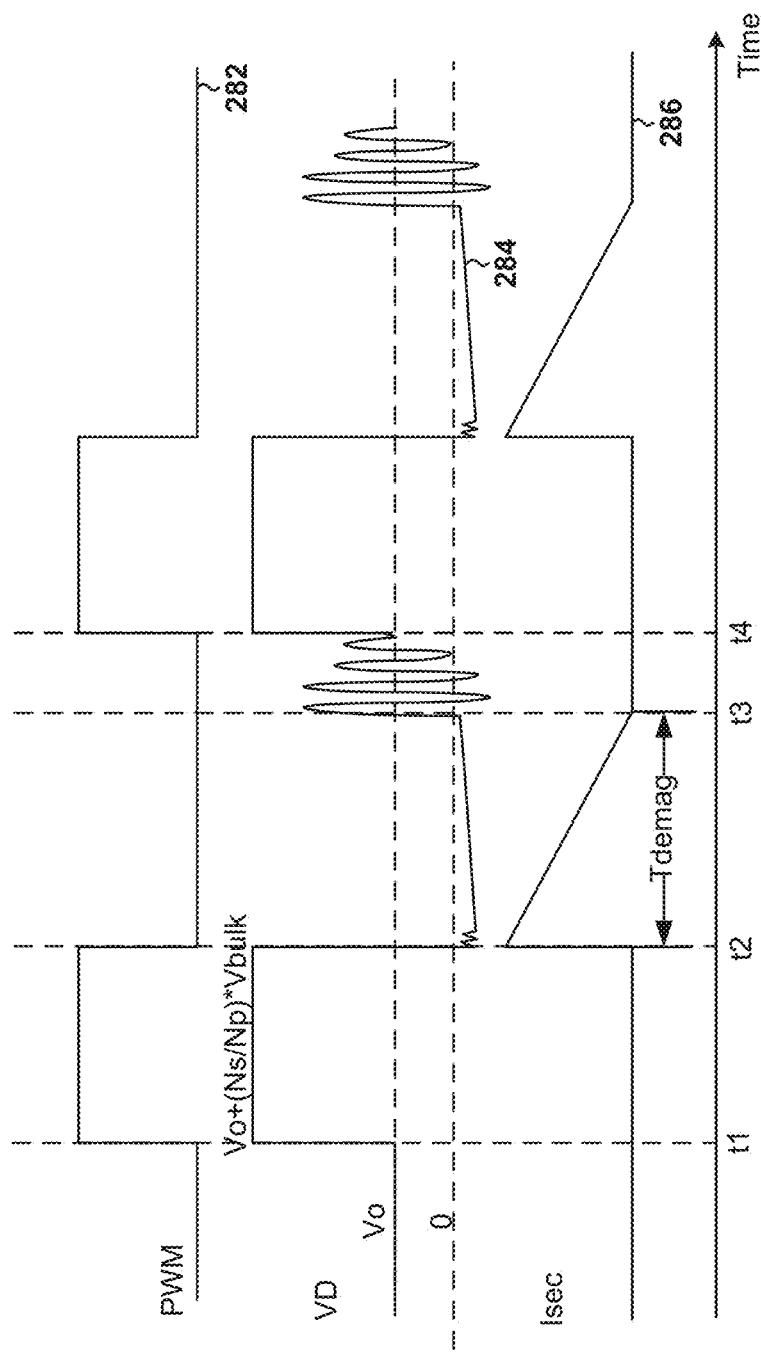
FIG. 2 shows simplified timing diagrams for the conventional flyback switching power supply system used as the AC to DC fast charging system as shown in FIG. 1 according to certain embodiments.

FIG. 2 shows simplified timing diagrams for the conventional flyback switching power supply system 100 used as the AC to DC fast charging system as shown in FIG. 1 according to certain embodiments. The waveform 282 represents the drive signal 182 (e.g., a PWM signal) as a function of time, the waveform 284 represents the voltage 184 (e.g., $V_D$) of the secondary winding 106 as a function of time, and the waveform 286 represents the current 186 (e.g., $I_{sec}$) as a function of time.

As shown by the waveform 282, at time $t_1$, the drive signal 182 (e.g., a PWM signal) changes from a logic low level to a logic high level and the primary-side power switch 112 changes from being open to being closed (e.g., the transistor M1 changing from being turned off to being turned on) according to some embodiments. As an example, from time $t_1$ to time $t_2$, the drive signal 182 (e.g., a PWM signal) remains at the logic high level and the primary-side power switch 112 remains closed (e.g., the transistor M1 being turned on). In certain examples, at time $t_2$, the drive signal 182 (e.g., a PWM signal) changes from the logic high level to the logic low level and the primary-side power switch 112 changes from being closed to being open (e.g., the transistor M1 changing from being turned on to being turned off). As an example, from time $t_2$ to time $t_4$, the drive signal 182 (e.g., a PWM signal) remains at the logic low level and the primary-side power switch 112 remains open (e.g., the transistor M1 being turned off). For example, when the drive signal 182 (e.g., a PWM signal) remains at the logic low level and the primary-side power switch 112 remains open (e.g., the transistor M1 being turned off) from time $t_2$ to time $t_4$, the secondary winding 106 undergoes a demagnetization process from time $t_2$ to time $t_3$ and undergoes a resonance process from time $t_3$ to time $t_4$. As an example, the time duration from time $t_2$ to time $t_3$ is a demagnetization period (e.g., $T_{demag}$).

According to certain embodiments, from time $t_1$ to time $t_2$, the transformer 102 (e.g., T1) provides the following relationship:

$$\frac{V_{bulk}}{(V_D - V_O)} = \frac{N_p}{N_s} \qquad \text{(Equation 1)}$$

where $V_{bulk}$ represents the input voltage 134, $V_D$ represents the voltage 184, and $V_o$ represents the output voltage 192. Additionally, $N_p$ represents the number of turns of the primary winding 104, and $N_s$ represents the number of turns of the secondary winding 106.

In some examples, the rectifier 132 (e.g., a bridge rectifier) receives the AC voltage 130 and generates the input voltage 134 (e.g., $V_{bulk}$) as follows:

$$V_{bulk} = \sqrt{2} \times V_{ac} \qquad \text{(Equation 2)}$$

where $V_{bulk}$ represents the input voltage 134, and $V_{ac}$ represents the effective value (e.g., the root mean square) of the AC voltage 130.

In certain examples, from Equation 1 and Equation 2, the voltage 184 is determined as follows:

$$V_D = \frac{N_s}{N_p} \times \sqrt{2} \times V_{ac} + V_O \quad \text{(Equation 3)}$$

where $V_D$ represents the voltage 184, $V_{ac}$ represents the effective value (e.g., the root mean square) of the AC voltage 130, and $V_o$ represents the output voltage 192. Additionally, $N_p$ represents the number of turns of the primary winding 104, and $N_s$ represents the number of turns of the secondary winding 106. For example, as shown by Equation 3, when the primary-side power switch 112 is closed (e.g., the transistor M1 is turned on), the voltage 184 (e.g., $V_D$) depends on the effective value (e.g., the RMS) of the AC voltage 130. As an example, the voltage 184 (e.g., $V_D$) of the secondary winding 106 is used to detect the effective value (e.g., the RMS) of the AC voltage 130.

Figure 3:
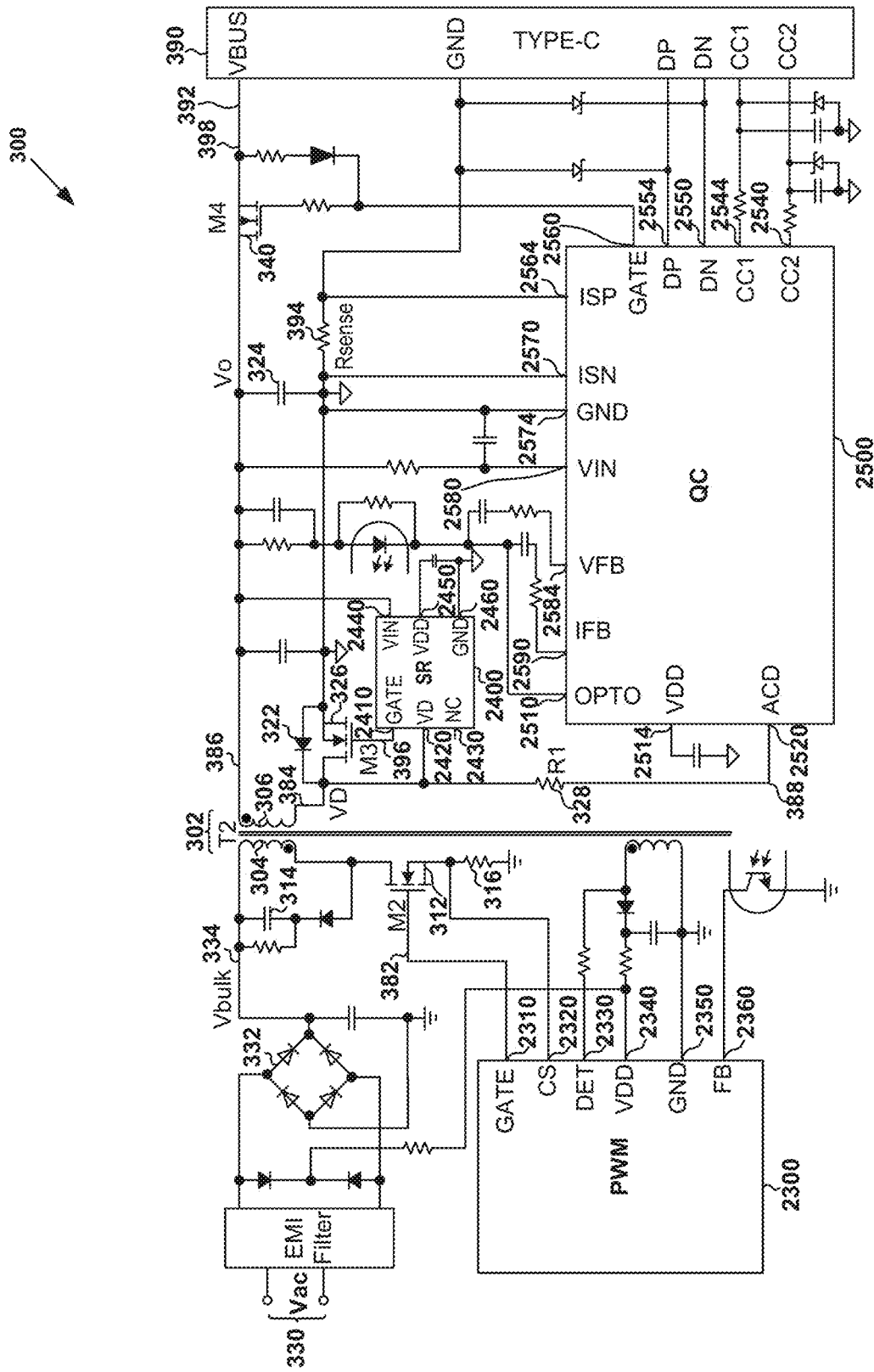
FIG. 3 is a simplified diagram showing a flyback switching power supply system used as a charging system according to certain embodiments of the present invention.

FIG. 3 is a simplified diagram showing a flyback switching power supply system used as a charging system according to certain embodiments of the present invention. This diagram is merely an example, which should not unduly limit the scope of the claims. One of ordinary skill in the art would recognize many variations, alternatives, and modifications. The flyback switching power supply system 300 (e.g., a power converter) includes a transformer 302 (e.g., T1) including a primary winding 304 and a secondary winding 306, a primary-side power switch 312 (e.g., a transistor M2), capacitors 314 and 324, resistors 316 and 328, a rectifier 332 (e.g., a bridge rectifier), a transistor 340 (e.g., a transistor M4), a resistor 394 (e.g., $R_{sense}$), and a transistor 326 (e.g., a transistor M3) including a body diode 322. Additionally, the flyback switching power supply system 300 (e.g., a power converter) also includes a pulse-width-modulation (PWM) controller 2300 (e.g., a chip), a synchronous rectification (SR) controller 2400 (e.g., a chip), and a charging controller 2500 (e.g., a chip). For example, the flyback switching power supply system 300 (e.g., a power converter) is used as an alternating current (AC) to direct current (DC) fast charging system. As an example, the charging controller 2500 (e.g., a chip) includes a fast charging protocol circuit (e.g., a QC circuit). Although the above has been shown using a selected group of components for the flyback switching power supply system 300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the pulse-width-modulation (PWM) controller 2300 (e.g., a chip) includes a terminal 2310 (e.g., a GATE pin), a terminal 2320 (e.g., a CS pin), a terminal 2330 (e.g., a DET pin), a terminal 2340 (e.g., a VDD pin), a terminal 2350 (e.g., a GND pin), and a terminal 2360 (e.g., an FB pin). In certain embodiments, the synchronous rectification (SR) controller 2400 (e.g., a chip) includes a terminal 2410 (e.g. a GATE pin), a terminal 2420 (e.g. a $V_D$ pin), a terminal 2430 (e.g. an NC pin), a terminal 2440 (e.g., a VIN pin), a terminal 2450 (e.g., a VDD pin), and a terminal 2460 (e.g., a GND pin). In some embodiments, the charging controller 2500 (e.g., a chip) includes a terminal 2510 (e.g., an OPTO pin), a terminal 2514 (e.g., a VDD pin), a terminal 2520 (e.g., an ACD pin), a terminal 2540 (e.g., a CC2 pin), a terminal 2544 (e.g., a CC1 pin), a terminal 2550 (e.g., a DN pin), a terminal 2554 (e.g., a DP pin), a terminal 2560 (e.g., a GATE pin), a terminal 2564 (e.g., an ISP pin), a terminal 2570 (e.g., an ISN pin), a terminal 2574 (e.g., a GND pin), a terminal 2580 (e.g., a VIN pin), a terminal 2584 (e.g., a VFB pin), and a terminal 2590 (e.g., an IFB pin). For example, the terminal 2564 (e.g., an ISP pin) is connected to one terminal of the resistor 394 (e.g., $R_{sense}$), and the terminal 2570 (e.g., an ISN pin) is connected to another terminal of the resistor 394 (e.g., $R_{sense}$). As an example, the resistor 394 (e.g., $R_{sense}$) is coupled between the terminal 2570 (e.g., an ISN pin) and the terminal 2564 (e.g., an ISP pin).

According to certain embodiments, one terminal of the secondary winding 306 is coupled to the transistor 326 (e.g., a transistor M3) and biased at a voltage 384 (e.g., $V_D$), and another terminal of the secondary winding 306 is coupled to a terminal of the capacitor 324. For example, the transistor 326 (e.g., a transistor M3) includes one terminal connected to the secondary winding 306, the terminal 2420 (e.g. a $V_D$ pin) of the synchronous rectification (SR) controller 2400 (e.g., a chip), and one terminal of the resistor 328 (e.g., R1). In some examples, the resistor 328 (e.g., R1) includes another terminal that is connected to the terminal 2520 (e.g., an ACD pin) of the charging controller 2500 (e.g., a chip). For example, the terminal 2520 (e.g., an ACD pin) is biased at a voltage 388 (e.g., $V_{ACD}$). In certain examples, the transistor 326 (e.g., a transistor M3) includes another terminal biased to a ground voltage on the secondary side of the flyback switching power supply system 300, and the transistor 326 (e.g., a transistor M3) also includes a gate terminal connected to the terminal 2410 (e.g. a GATE pin) of the synchronous rectification (SR) controller 2400 (e.g., a chip). For example, the gate terminal of the transistor 326 (e.g., a transistor M3) receives a drive signal 396 from the terminal 2410 (e.g. a GATE pin) of the synchronous rectification (SR) controller 2400 (e.g., a chip). As shown in FIG. 3, the terminal 2420 (e.g. a $V_D$ pin) of the synchronous rectification (SR) controller 2400 (e.g., a chip) receives the voltage 384 (e.g., $V_D$) of the secondary winding 306 according to some embodiments.

In certain embodiments, the rectifier 332 (e.g., a bridge rectifier) receives an alternating current (AC) voltage 330 from a voltage supply (e.g., an AC power supply). For example, the rectifier 332 (e.g., a bridge rectifier) is coupled to the capacitor 314 and provides an input voltage 334 (e.g., $V_{bulk}$) to one terminal of the primary winding 304. In some examples, the primary winding 304 also includes another terminal that is connected to a drain terminal of the primary-side power switch 312 (e.g., a transistor M2), which also includes a gate terminal and a source terminal. As an example, the source terminal of the primary-side power switch 312 (e.g., a transistor M2) is connected to one terminal of the resistor 316, which includes another terminal biased to a ground voltage on the primary side of the flyback switching power supply system 300. For example, the gate terminal of the primary-side power switch 312 (e.g., a transistor M2) receives a drive signal 382, which closes or opens the primary-side power switch 312 (e.g., turns on or turns off the transistor M2). In certain examples, the drive signal 382 is a pulse-width-modulation (PWM) signal. For example, if the drive signal 382 is at a logic high level, the primary-side power switch 312 is closed (e.g., the transistor M2 being turned on). As an example, if the drive signal 382 is at a logic low level, the primary-side power switch 312 is open (e.g., the transistor M2 being turned off).

In some embodiments, the primary winding 304 is coupled to the secondary winding 306. For example, one terminal of the secondary winding 306 is connected to one terminal of the transistor 326 (e.g., a transistor M3), the terminal 2420 (e.g. a $V_D$ pin) of the synchronous rectification (SR) controller 2400 (e.g., a chip), and one terminal of the resistor 328 (e.g., R1). As another example, another terminal of the secondary winding 306 is coupled to a terminal of the capacitor 324. In certain examples, the capacitor 324 includes another terminal that is biased to a ground voltage on the secondary side of the flyback switching power supply system 300. For example, a current 386 (e.g., $I_{sec}$) flows out of the secondary winding 306, and the capacitor 324 provides an output voltage 392 (e.g., $V_o$) to a load 390 (e.g., a Type-C device) if the transistor 340 (e.g., a transistor M4) is turned on. As an example, the load 390 is a device including one or more batteries that need to be charged by the flyback switching power supply system 300 (e.g., a power converter). For example, if the transistor 340 (e.g., a transistor M4) is turned on, the flyback switching power supply system 300 (e.g., a power converter) also provides an output current 398 (e.g., $I_o$) to the load 390 (e.g., a Type-C device). As an example, if the transistor 340 (e.g., a transistor M4) is turned off, the flyback switching power supply system 300 (e.g., a power converter) reduces the output current 398 (e.g., $I_o$) to the load 390 (e.g., a Type-C device) to zero.

In some examples, the resistor 394 (e.g., $R_{sense}$) is used to detect the output current 398 (e.g., $I_o$) in order to obtain a constant output current through current loop modulation and/or to achieve overcurrent protection (OCP). As an example, the resistor 394 (e.g., $R_{sense}$) becomes short circuited due to, for example, aging and/or welding, and if no additional protection mechanism is implemented, the resistor 394 (e.g., $R_{sense}$) being short circuited can cause the output current 398 (e.g., $I_o$) to run out of control. For example, when the resistor 394 (e.g., $R_{sense}$) is short circuited, if no additional protection mechanism is implemented, the current loop is open and/or the overcurrent protection fails. As an example, without additional protection mechanism, the uncontrolled peak magnitude of the output current 398 (e.g., $I_o$) can damage one or more components of the flyback switching power supply system 300 (e.g., a power converter) and/or the load 390 (e.g., a Type-C device) to be charged by the flyback switching power supply system 300 (e.g., a power converter).

According to certain embodiments, when the primary-side power switch 312 (e.g., a transistor M2) is turned on, the primary winding 304 stores energy and the synchronous rectification (SR) controller 2400 (e.g., a chip) turns off the transistor 326 (e.g., a transistor M3). In some examples, the transistor 326 is a metal-oxide-semiconductor field-effect transistor (MOSFET). For example, the MOSFET 326 is an NMOS transistor. As an example, the MOSFET 326 is a PMOS transistor. In some examples, when the primary-side power switch 312 (e.g., a transistor M2) is turned off, the primary winding 304 transfers the stored energy to the secondary winding 306, and the synchronous rectification (SR) controller 2400 (e.g., a chip) turns on the transistor 326 (e.g., a transistor M3). For example, the secondary winding 306 undergoes the demagnetization process. As an example, the secondary winding 306 provides energy to the load 390 (e.g., a Type-C device) to be charged by the flyback switching power supply system 300 (e.g., a power converter).

According to some embodiments, the charging controller 2500 (e.g., a chip) includes the fast charging protocol circuit (e.g., a QC circuit). For example, the fast charging protocol circuit (e.g., a QC circuit) of the charging controller 2500 (e.g., a chip) is integrated with one or more voltage and/or current loops. As an example, the fast charging protocol circuit (e.g., a QC circuit) of the charging controller 2500 (e.g., a chip) is configured to communicate with the load 390 (e.g., a Type-C device) to be charged by the flyback switching power supply system 300 (e.g., a power converter) through the terminal 2544 (e.g., a CC1 pin), the terminal 2540 (e.g., a CC2 pin), the terminal 2554 (e.g., a DP pin), and the terminal 2550 (e.g., a DN pin) in order to set one or more voltages, currents, and/or powers. For example, the fast charging protocol circuit (e.g., a QC circuit) of the charging controller 2500 (e.g., a chip) is configured to send one or more notification signals to the load 390 (e.g., a Type-C device) through the terminal 2544 (e.g., a CC1 pin), the terminal 2540 (e.g., a CC2 pin), the terminal 2554 (e.g., a DP pin), and/or the terminal 2550 (e.g., a DN pin). As an example, the load 390 is a device that is to be charged by the flyback switching power supply system 300 (e.g., a power converter).

As discussed above and further emphasized here, FIG. 3 is merely an example, which should not unduly limit the scope of the claims. One of ordinary skill in the art would recognize many variations, alternatives, and modifications. For example, the load 390 (e.g., a Type-C device) is replaced by a plurality of loads to be charged by the flyback switching power supply system 300 (e.g., a power converter).

Figure 4:
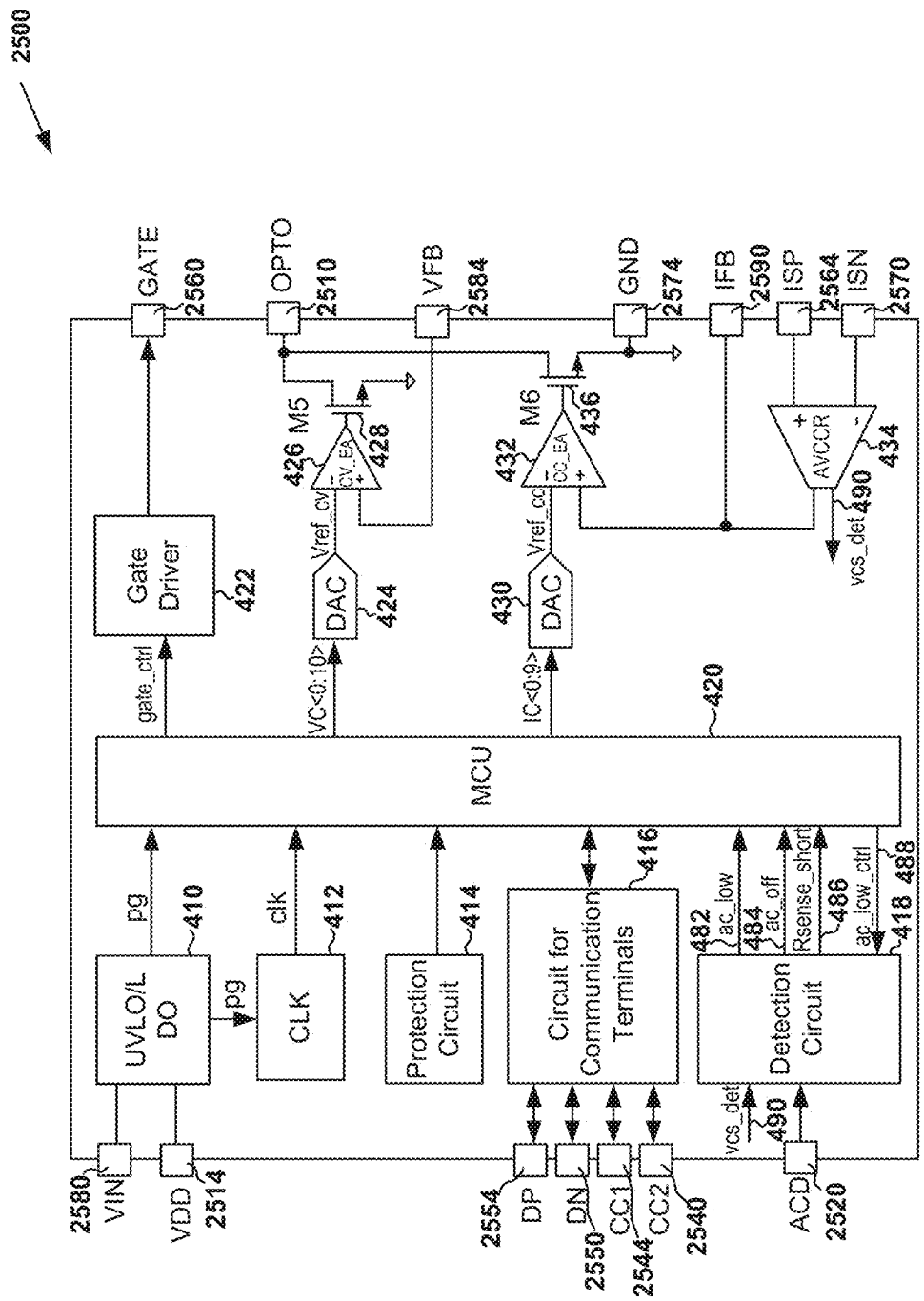
FIG. 4 is a simplified diagram showing the charging controller as part of the flyback switching power supply system used as a charging system as shown in FIG. 3 according to some embodiments of the present invention.

FIG. 4 is a simplified diagram showing the charging controller 2500 as part of the flyback switching power supply system 300 used as a charging system as shown in FIG. 3 according to some embodiments of the present invention. This diagram is merely an example, which should not unduly limit the scope of the claims. One of ordinary skill in the art would recognize many variations, alternatives, and modifications. The charging controller 2500 (e.g., a chip) includes the terminal 2510 (e.g., an OPTO pin), the terminal 2514 (e.g., a VDD pin), the terminal 2520 (e.g., an ACD pin), the terminal 2540 (e.g., a CC2 pin), the terminal 2544 (e.g., a CC1 pin), the terminal 2550 (e.g., a DN pin), the terminal 2554 (e.g., a DP pin), the terminal 2560 (e.g., a GATE pin), the terminal 2564 (e.g., an ISP pin), the terminal 2570 (e.g., an ISN pin), the terminal 2574 (e.g., a GND pin), the terminal 2580 (e.g., a VIN pin), the terminal 2584 (e.g., a VFB pin), and the terminal 2590 (e.g., an IFB pin). Additionally, the charging controller 2500 (e.g., a chip) includes a circuit 410 for undervoltage-lockout (UVLO) and low-dropout (LDO) regulator, a clock 412, a protection circuit 414, a circuit 416 for communication terminals, a detection circuit 418 (e.g., a voltage detector), a microcontroller unit (MCU) 420, a gate driver 422, a digital-to-analog converter (DAC) 424, an error amplifier 426 (e.g., CV_EA), a transistor 428 (e.g., M5), a digital-to-analog converter (DAC) 430, an error amplifier 432 (e.g., CC_EA), a transistor 436 (e.g., M6), and an output current amplifier 434 (e.g., AVCCR). Although the above has been shown using a selected group of components for the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the circuit 410 for undervoltage-lockout (UVLO) and low-dropout (LDO) regulator includes two input terminals, which are connected to the terminal 2580 (e.g., a VIN pin) and the terminal 2514 (e.g., a VDD pin) respectively. As an example, the circuit 410 for undervoltage-lockout (UVLO) and low-dropout (LDO) regulator sends an output signal (e.g., pg) through an output terminal to the microcontroller unit (MCU) 420 and also sends the output signal (e.g., pg) through another output terminal to the clock 412. For example, the clock 412 generates a clock signal (e.g., clk) and sends the clock signal (e.g., clk) through an output terminal to the microcontroller unit (MCU) 420.

According to some embodiments, the protection circuit 414 generates and sends a protection signal through an output terminal to the microcontroller unit (MCU) 420. In certain examples, the circuit 416 for communication terminals are coupled to the terminal 2554 (e.g., a DP pin), the terminal 2550 (e.g., a DN pin), the terminal 2544 (e.g., a CC1 pin), the terminal 2540 (e.g., a CC2 pin), and the microcontroller unit (MCU) 420. In some examples, the detection circuit 418 receives an input signal (e.g., the from the terminal 2520 (e.g., an ACD pin), an input signal 490 (e.g., vcs_det) from the output current amplifier 434 (e.g., AVCCR), and an input signal 488 (e.g., ac_low_ctrl) from the microcontroller unit (MCU) 420, and sends an output signal 482 (e.g., ac_low), an output signal 484 (e.g., ac_off) and an output signal 486 (e.g., Rsense_short), through three output terminals respectively, to the microcontroller unit (MCU) 420. As an example, the input signal 490 (e.g., vcs_det) is a detection voltage, which for example is related to the resistor 394 (e.g., $R_{sense}$). In certain examples, the gate driver 422 receives a signal (e.g., gate_ctrl) from the microcontroller unit (MCU) 420 and sends a drive signal to the terminal 2560 (e.g., a GATE pin).

In certain embodiments, the digital-to-analog converter (DAC) 424 receives a signal (e.g., VC<0:10>) from the microcontroller unit (MCU) 420 and sends a signal (e.g., Vref_cv) to an inverting input terminal (e.g., a "−" terminal) of the error amplifier 426 (e.g., CV_EA). For example, a non-inverting input terminal (e.g., a "+" terminal) of the error amplifier 426 (e.g., CV_EA) also receives a signal from the terminal 2584 (e.g., a VFB pin), and an output terminal of the error amplifier 426 (e.g., CV_EA) sends a signal to the gate of the transistor 428 (e.g., M5). As an example, the drain of the transistor 428 (e.g., M5) is connected to the terminal 2510 (e.g., an OPTO pin), and the source of the transistor 428 (e.g., M5) is biased to the ground voltage on the secondary side of the flyback switching power supply system 300.

In some embodiments, the digital-to-analog converter (DAC) 430 receives a signal (e.g., IC<0:9>) from the microcontroller unit (MCU) 420 and sends a signal (e.g., Vref_cc) to an inverting input terminal (e.g., a "−" terminal) of the error amplifier 432 (e.g., CC_EA). For example, a non-inverting input terminal (e.g., a "+" terminal) of the error amplifier 432 (e.g., CC_EA) is coupled to the terminal 2590 (e.g., an IFB pin) and an output terminal of the output current amplifier 434 (e.g., AVCCR), and an output terminal of the error amplifier 432 (e.g., CV_EA) sends a signal to the gate of the transistor 436 (e.g., M6). As an example, the drain of the transistor 436 (e.g., M6) is connected to the terminal 2510 (e.g., an OPTO pin), and the source of the transistor 428 (e.g., M5) is biased to the ground voltage on the secondary side of the flyback switching power supply system 300. For example, the terminal 2574 (e.g., a GND pin) is also biased to the ground voltage on the secondary side of the flyback switching power supply system 300.

According to certain embodiments, the output current amplifier 434 (e.g., AVCCR) includes a non-inverting input terminal (e.g., a "+" terminal) coupled to the terminal 2564 (e.g., an ISP pin) and also includes an inverting input terminal (e.g., a "−" terminal) coupled to the terminal 2570 (e.g., an ISN pin). For example, the output current amplifier 434 (e.g., AVCCR) includes the output terminal that is coupled to the non-inverting input terminal (e.g., a "+" terminal) of the error amplifier 432 (e.g., CC_EA). As an example, the output current amplifier 434 (e.g., AVCCR) also includes another output terminal that sends the input signal 490 (e.g., vcs_det) to the detection circuit 418.

According to some embodiments, the charging controller 2500 (e.g., a chip) communicates, through the terminal 2554 (e.g., a DP pin), the terminal 2550 (e.g., a DN pin), the terminal 2544 (e.g., a CC1 pin) and the terminal 2540 (e.g., a CC2 pin), with the load 390 (e.g., a Type-C device) that is to be charged. In some examples, the charging controller 2500 (e.g., a chip) sends one or more notification signals to inform the load 390 (e.g., a Type-C device) of the voltage, the current, and/or the power supported by the charging controller 2500 (e.g., a chip). For example, the charging controller 2500 (e.g., a chip) responds to the voltage and/or the current requested by the load 390 (e.g., a Type-C device) that is to be charged. In certain examples, the charging controller 2500 (e.g., a chip) monitors for one or more abnormal conditions (e.g., a voltage condition, a current condition, and/or a temperature condition) in real time. As an example, the charging controller 2500 (e.g., a chip) causes the transistor 340 (e.g., a transistor M4) to be turned off and/or causes a capacitor related to a charging voltage (e.g., VBUS) to be discharged in order to protect the load 390 (e.g., a Type-C device) from damage.

As shown in FIG. 4, the charging controller 2500 (e.g., a chip) uses the voltage 388 (e.g., $V_{ACD}$) at the terminal 2520 (e.g., an ACD pin) and detects information associated with the AC voltage 330 according to certain embodiments. According to some embodiments, the detection circuit 418 determines whether the AC voltage 330 is in a high-voltage state or in a low-voltage state and also sends to the microcontroller unit (MCU) 420 the output signal 482 (e.g., ac_low) that indicates the determined state for the AC voltage 330. In certain examples, if the AC voltage 330 is determined to be in the low-voltage state, the output signal 482 (e.g., ac_low) is at a logic high level so that in response, the microcontroller unit (MCU) 420 causes the flyback switching power supply system 300 to set the output power to a lower power level. For example, if the AC voltage 330 is determined to be in the low-voltage state, the output signal 482 (e.g., ac_low) is at the logic high level so that in response, the microcontroller unit (MCU) 420 reduces the output power of the flyback switching power supply system 300 in order to prevent the charging current from overheating the flyback switching power supply system 300. As an example, through the terminal 2554 (e.g., a DP pin), the terminal 2550 (e.g., a DN pin), the terminal 2544 (e.g., a CC1 pin) and/or the terminal 2540 (e.g., a CC2 pin), the charging controller 2500 (e.g., a chip) sends one or more notification signals to inform the load 390 (e.g., a Type-C device) of the reduction of the output power. In some examples, if the AC voltage 330 is determined to be in the high-voltage state, the output signal 482 (e.g., ac_low) is at a logic low level so that in response, the microcontroller unit (MCU) 420 causes the flyback switching power supply system 300 to set the output power to a higher power level that is higher than the lower power level. For example, if the AC voltage 330 is determined to be in the high-voltage state, the output signal 482 (e.g., ac_low) is at a logic low level so that in response, the microcontroller unit (MCU) 420 increases the output power of the flyback switching power supply system 300 in order to speed up the charging of the load 390 (e.g., a Type-C device) by the flyback switching power supply system 300. As an example, through the terminal 2554 (e.g., a DP pin), the terminal 2550 (e.g., a DN pin), the terminal 2544 (e.g., a CC1 pin) and/or the terminal 2540 (e.g., a CC2 pin), the charging controller 2500 (e.g., a chip) sends one or more notification signals to inform the load 390 (e.g., a Type-C device) of the increase of the output power.

In some embodiments, the detection circuit 418 generates or receives the voltage 388 (e.g., $V_{ACD}$) at the terminal 2520 (e.g., an ACD pin) and the input signal 488 (e.g., ac_low_ctrl) from the microcontroller unit (MCU) 420, and determines whether or not the flyback switching power supply system 300 is unplugged from the voltage supply (e.g., an AC power supply) that provides the AC voltage 330, and the detection circuit 418 also sends to the microcontroller unit (MCU) 420 the output signal 484 (e.g., ac_off) that indicates whether or not the flyback switching power supply system 300 is determined to be unplugged. In certain embodiments, the detection circuit 418 generates or receives the voltage 388 (e.g., $V_{ACD}$) at the terminal 2520 (e.g., an ACD pin) and the input signal 490 (e.g., vcs_det) from the output current amplifier 434 (e.g., AVCCR) and determines whether or not the resistor 394 (e.g., $R_{sense}$) is short circuited, and the detection circuit 418 also sends to the microcontroller unit (MCU) 420 the output signal 486 (e.g., $R_{sense}$_short) that indicates whether or not the resistor 394 (e.g., $R_{sense}$) has been determined to be short circuited.

As discussed above and further emphasized here, FIG. 4 is merely an example, which should not unduly limit the scope of the claims. One of ordinary skill in the art would recognize many variations, alternatives, and modifications. In some embodiments, the detection circuit 418 generates the voltage 388 (e.g., $V_{ACD}$) but not receive the input signal 490 (e.g., vcs_det) from the output current amplifier 434 (e.g., AVCCR) and not receive the input signal 488 (e.g., ac_low_ctrl) from the microcontroller unit (MCU) 420, and the detection circuit 418 generates the output signal 482 (e.g., ac_low) but not the output signal 484 (e.g., ac_off) and not the output signal 486 (e.g., $R_{sense}$_short). For example, the detection circuit 418 is implemented according to FIG. 5. In certain embodiments, the detection circuit 418 generates or receives the voltage 388 (e.g., $V_{ACD}$) and the input signal 488 (e.g., ac_low_ctrl) from the microcontroller unit (MCU) 420 but not receive the input signal 490 (e.g., vcs_det) from the output current amplifier 434 (e.g., AVCCR), and the detection circuit 418 generates the output signal 482 (e.g., ac_low) and the output signal 484 (e.g., ac_off) but not the output signal 486 (e.g., Rsense_short). For example, the detection circuit 418 is implemented according to FIG. 7 and/or FIG. 9. In some embodiments, the detection circuit 418 generates or receives the voltage 388 (e.g., $V_{ACD}$), the input signal 488 (e.g., ac_low_ctrl) from the microcontroller unit (MCU) 420, and the input signal 490 (e.g., vcs_det) from the output current amplifier 434 (e.g., AVCCR), and the detection circuit 418 generates the output signal 482 (e.g., ac_low), the output signal 484 (e.g., ac_off), and the output signal 486 (e.g., $R_{sense}$_short). For example, the detection circuit 418 is implemented according to FIG. 8 and/or FIG. 10.

Figure 5:
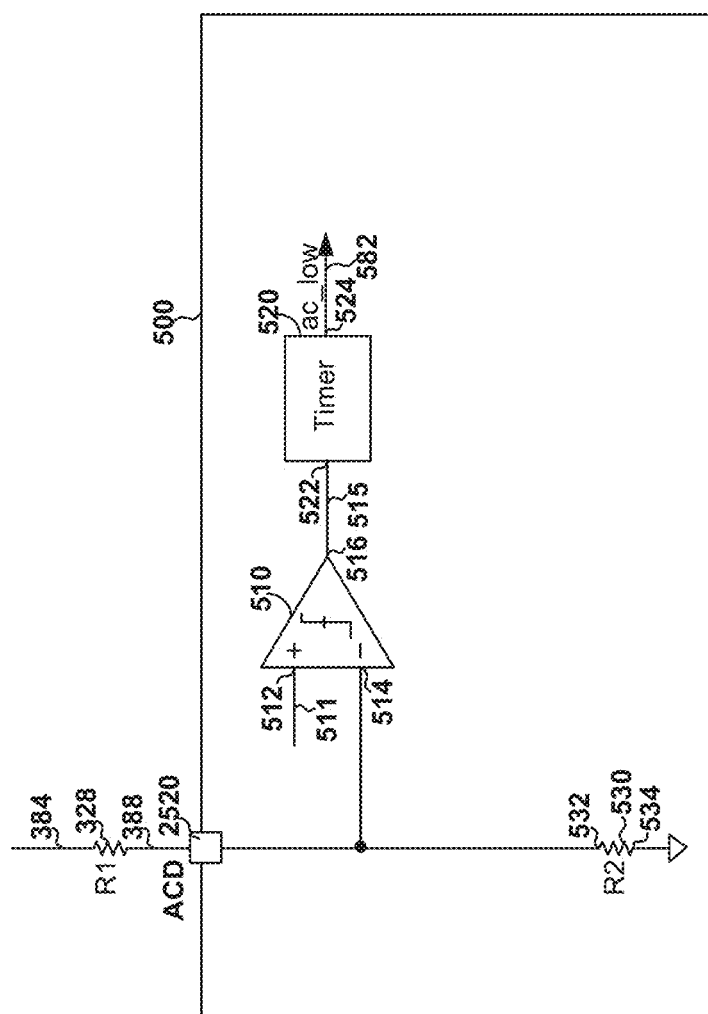
FIG. 5 is a simplified diagram showing certain components of the detection circuit as part of the charging controller of the flyback switching power supply system as shown in FIG. 3 and FIG. 4 according to some embodiments of the present invention.

FIG. 5 is a simplified diagram showing certain components of the detection circuit 500 as part of the charging controller 2500 of the flyback switching power supply system 300 as shown in FIG. 3 and FIG. 4 according to some embodiments of the present invention. The detection circuit 500 includes a comparator 510, a timer 520, and a resistor 530. In some examples, the detection circuit 500 is configured to detect whether the AC voltage 330 is in a high-voltage state or in a low-voltage state. In certain examples, the detection circuit 500 is used as the detection circuit 418 (e.g., a voltage detector) that generates the voltage 388 (e.g., $V_{ACD}$) but not receive the input signal 490 (e.g., vcs_det) from the output current amplifier 434 (e.g., AVCCR) and not receive the input signal 488 (e.g., ac_low_ctrl) from the microcontroller unit (MCU) 420 and that generates the output signal 482 (e.g., ac_low) but not the output signal 484 (e.g., ac_off) and not the output signal 486 (e.g., $R_{sense}$_short). Although the above has been shown using a selected group of components for the detection circuit 500 of the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the resistor 530 (e.g., R2) includes two terminals 532 and 534. In some examples, the terminal 532 is connected to the terminal 2520 (e.g., an ACD pin), and the terminal 534 is biased to a ground voltage on the secondary side of the flyback switching power supply system 300. In certain examples, the terminal 2520 (e.g., an ACD pin) is also connected to a terminal of the resistor 328 (e.g., R1), which includes another terminal configured to receive the voltage 384 (e.g., $V_D$) of the secondary winding 306. For example, the voltage 384 (e.g., $V_D$) represents the effective value (e.g., the RMS) of the AC voltage 330.

According to some embodiments, the resistor 328 (e.g., R1) and the resistor 530 (e.g., R2) are parts of a voltage divider that generates the voltage 388 (e.g., $V_{ACD}$). For example, the voltage 388 (e.g., $V_{ACD}$) is determined as follows:

$$V_{ACD} = \frac{R_2}{R_1 + R_2} \times V_D \qquad \text{(Equation 4)}$$

where $V_{ACD}$ represents the voltage 388, and $V_D$ represents the voltage 384. Additionally, $R_1$ represents the resistor 328, and R2 represents the resistor 530. As an example, the voltage 388 (e.g., $V_{ACD}$) represents the effective value (e.g., the RMS) of the AC voltage 330.

According to some embodiments, the comparator 510 includes a non-inverting input terminal 512 (e.g., a "+" terminal), an inverting input terminal 514 (e.g., a "−" terminal), and an output terminal 516. For example, the non-inverting input terminal 512 (e.g., a "+" terminal) receives a threshold voltage 511 (e.g., $V_{R1}$). As an example, the inverting input terminal 514 (e.g., a "−" terminal) receives the voltage 388 (e.g., $V_{ACD}$) from the terminal 532 of the resistor 530 (e.g., R2). In certain examples, the comparator 510 compares the threshold voltage 511 (e.g., $V_{R1}$) and the voltage 388 (e.g., $V_{ACD}$) and outputs a comparison signal 515 at the output terminal 516.

In certain embodiments, the comparison signal 515 is received by an input terminal 522 of the timer 520, and in response the timer 520 generates an output signal 582 (e.g., ac_low) at an output terminal 524 of the timer 520. For example, if the comparison signal 515 is at a logic low level, the output signal 582 (e.g., ac_low) is also at the logic low level. As an example, if the comparison signal 515 changes from the logic low level to a logic high level and then remains at the logic high level for at least a predetermined time duration, the output signal 582 (e.g., ac_low) changes from the logic low level to the logic high level. For example, if the comparison signal 515 changes from the logic low level to the logic high level but remains at the logic high level for only a time period that is shorter than the predetermined time duration before changing from the logic high level back to the logic low level, the output signal 582 (e.g., ac_low) is at the logic low level. In some embodiments, the output signal 582 (e.g., ac_low) is used as the output signal 482 (e.g., ac_low) and received by the microcontroller unit (MCU) 420. For example, if the output signal 582 (e.g., ac_low) is at the logic low level, the microcontroller unit (MCU) 420 determines that the AC voltage 330 is in the high-voltage state. As an example, if the output signal 582 (e.g., ac_low) is at the logic high level, the microcontroller unit (MCU) 420 determines that the AC voltage 330 is in the low-voltage state.

In some examples, if the voltage 388 (e.g., $V_{ACD}$) remains lower than the threshold voltage 511 (e.g., $V_{R1}$) during the predetermined time duration, the output signal 582 (e.g., ac_low) is at the logic high level, indicating that the AC voltage 330 is in the low-voltage state. In certain examples, if the voltage 388 (e.g., $V_{ACD}$) becomes higher than the threshold voltage 511 (e.g., $V_{R1}$) at any time during the predetermined time duration, the output signal 582 (e.g., ac_low) is at the logic low level, indicating that the AC voltage 330 is in the high-voltage state.

As shown in FIG. 5, the detection circuit 500 is used as the detection circuit 418 to determine whether the AC voltage 330 is in the high-voltage state or in the low-voltage state based at least in part on the comparison signal 515 during the predetermined time duration according to some embodiments. For example, if the AC voltage 330 is determined to be in the high-voltage state, the flyback switching power supply system 300 increases its output power in order to speed up the charging of the load 390 (e.g., a Type-C device) by the flyback switching power supply system 300. As an example, if the AC voltage 330 is determined to be in the low-voltage state, the flyback switching power supply system 300 decreases its output power in order to avoid insufficient input power on the primary side of the flyback switching power supply system 300.

Figure 6:
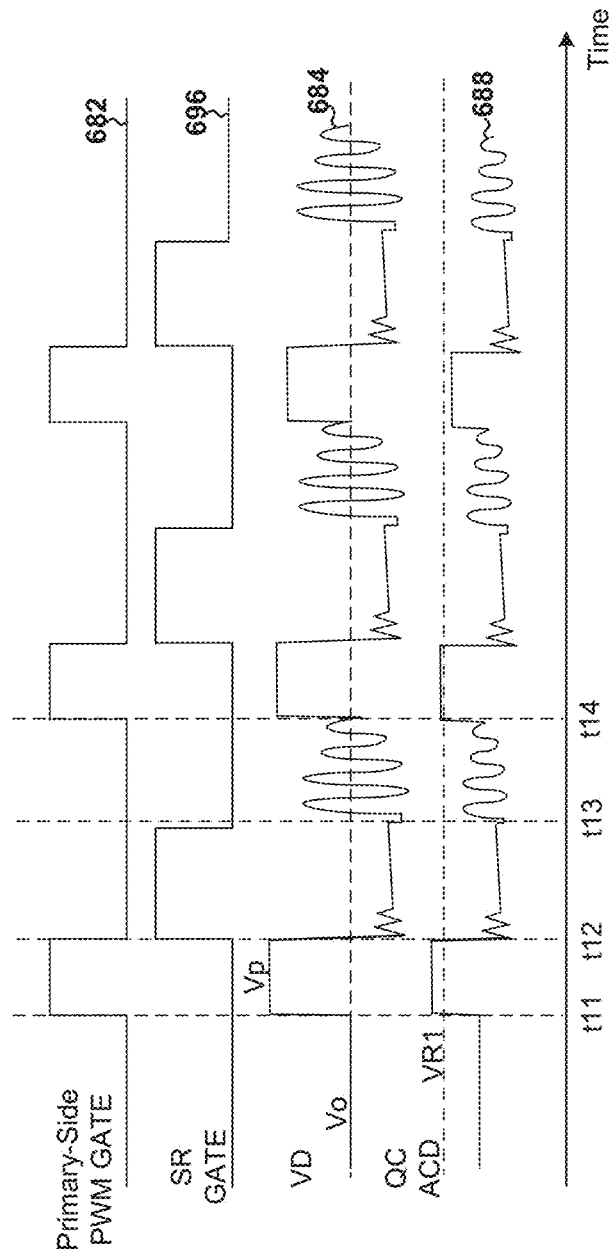
FIG. 6 shows a simplified timing diagram for the flyback switching power supply system that includes the detection circuit as shown in FIG. 3 and FIG. 5 according to certain embodiments of the present invention.

FIG. 6 shows a simplified timing diagram for the flyback switching power supply system 300 that includes the detection circuit 500 as shown in FIG. 3 and FIG. 5 according to certain embodiments of the present invention. This diagram is merely an example, which should not unduly limit the scope of the claims. One of ordinary skill in the art would recognize many variations, alternatives, and modifications. For example, the waveform 682 represents the drive signal 382 as a function of time, the waveform 696 represents the drive signal 396 as a function of time, the waveform 684 represents the voltage 384 (e.g., $V_D$) as a function of time, and the waveform 688 represents the voltage 388 (e.g., $V_{ACD}$) as a function of time. As an example, the drive signal 382 (e.g., the drive voltage 382) is received by the gate terminal of the primary-side power switch 312 (e.g., a transistor M2), the drive signal 396 is received by the gate terminal of the transistor 326 (e.g., a transistor M3), and the voltage 384 (e.g., $V_D$) is received by the terminal 2420 (e.g. a $V_D$ pin) of the synchronous rectification (SR) controller 2400 (e.g., a chip) from the secondary winding 306. As an example, the terminal 2520 (e.g., an ACD pin) is biased at the voltage 388 (e.g., $V_{ACD}$).

As shown by the waveform 682, at time $t_{11}$, the drive signal 382 (e.g., a PWM signal) changes from a logic low level to a logic high level and the primary-side power switch 312 changes from being open to being closed (e.g., the transistor M2 changing from being turned off to being turned on) according to some embodiments. As an example, from time $t_{11}$ to time $t_{12}$, the drive signal 382 (e.g., a PWM signal) remains at the logic high level and the primary-side power switch 312 remains closed (e.g., the transistor M2 being turned on). In certain examples, at time $t_{12}$, the drive signal 382 (e.g., a PWM signal) changes from the logic high level to the logic low level and the primary-side power switch 312 changes from being closed to being open (e.g., the transistor M2 changing from being turned on to being turned off). As an example, from time $t_{12}$ to time $t_{14}$, the drive signal 382 (e.g., a PWM signal) remains at the logic low level and the primary-side power switch 312 remains open (e.g., the transistor M2 being turned off). For example, when the drive signal 382 (e.g., a PWM signal) remains at the logic low level and the primary-side power switch 312 remains open (e.g., the transistor M2 being turned off) from time $t_{12}$ to time $t_{14}$, the secondary winding 306 undergoes a demagnetization process from time $t_{12}$ to time $t_{13}$ and undergoes a resonance process from time $t_{13}$ to time $t_{14}$.

According to certain embodiments, from time $t_{11}$ to time $t_{12}$, the voltage 384 is determined as follows:

$$V_P = \frac{N_s}{N_p} \times \sqrt{2} \times V_{ac} + V_O \quad \text{(Equation 5)}$$

where $V_P$ represents the magnitude of the voltage 384 (e.g., $V_D$) from time $t_{11}$ to time $t_{12}$, $V_{ac}$ represents the effective value (e.g., the root mean square) of the AC voltage 330, and $V_o$ represents the output voltage 392. Additionally, $N_p$ represents the number of turns of the primary winding 304, and $N_s$ represents the number of turns of the secondary winding 306. For example, as shown by Equation 5, when the primary-side power switch 312 is closed (e.g., the transistor M2 is turned on), the magnitude of the voltage 384 (e.g., $V_D$) depends on the effective value (e.g., the RMS) of the AC voltage 330. As an example, from time $t_{11}$ to time $t_{12}$, the magnitude of the voltage 384 (e.g., $V_D$) is used to detect the effective value (e.g., the RMS) of the AC voltage 330.

In some embodiments, as shown by Equations 4 and 5, from time $t_{11}$ to time $t_{12}$, the voltage 388 (e.g., $V_{ACD}$) is determined as follows:

$$V_{ACD} = \frac{R_2}{R_1 + R_2} \times \left( \frac{N_s}{N_p} \times \sqrt{2} \times V_{ac} + V_O \right) \quad \text{(Equation 6)}$$

where $V_{ACD}$ represents the voltage 388, $V_{ac}$ represents the effective value (e.g., the root mean square) of the AC voltage 330, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 530.

In certain embodiments, as shown by Equation 6, from time $t_{11}$ to time $t_{12}$, the effective value (e.g., the root mean square) of the AC voltage 330 is determined as follows:

$$V_{ac} = \frac{\sqrt{2}}{2} \times \frac{N_p}{N_s} \times \left( V_{ACD} \times \frac{R_1 + R_2}{R_2} - V_O \right) \quad \text{(Equation 7)}$$

where $V_{ac}$ represents the effective value (e.g., the root mean square) of the AC voltage 330, $V_{ACD}$ represents the voltage 388, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 530.

As shown in FIG. 5, the comparator 510 uses the threshold voltage 511 (e.g., $V_{R1}$) to compare with the voltage 388 (e.g., $V_{ACD}$) in order to determine the comparison signal 515 according to some embodiments. According to certain embodiments, as shown by Equation 7, effectively, the comparator 510 uses a threshold voltage $V_{ac\_det}$ as shown in Equation 8 to compare with the effective value (e.g., the root mean square) of the AC voltage 330 in order to determine the comparison signal 515.

$$V_{ac\_det} = \frac{\sqrt{2}}{2} \times \frac{N_p}{N_s} \times \left( V_{R1} \times \frac{R_1 + R_2}{R_2} - V_O \right) \quad \text{(Equation 8)}$$

where $V_{R1}$ represents the threshold voltage 511, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 530.

In some examples, if the effective value (e.g., the root mean square) of the AC voltage 330 remains lower than the threshold voltage $V_{ac\_det}$ during the predetermined time duration, the output signal 582 (e.g., ac_low) is at the logic high level, indicating that the AC voltage 330 is in the low-voltage state. In certain examples, if the effective value (e.g., the root mean square) of the AC voltage 330 becomes higher than the threshold voltage $V_{ac\_det}$ at any time during the predetermined time duration, the output signal 582 (e.g., ac_low) is at the logic low level, indicating that the AC voltage 330 is in the high-voltage state.

Figure 7:
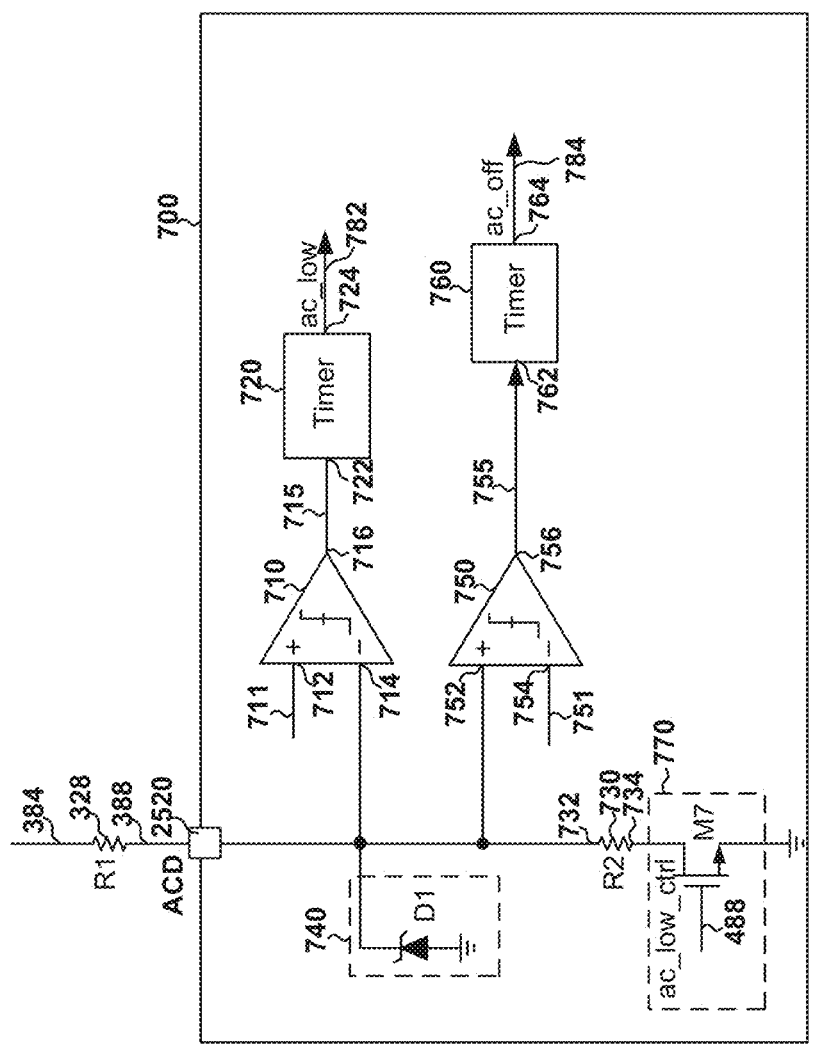
FIG. 7 is a simplified diagram showing certain components of the detection circuit as part of the charging controller of the flyback switching power supply system as shown in FIG. 3 and FIG. 4 according to some embodiments of the present invention.

FIG. 7 is a simplified diagram showing certain components of the detection circuit 700 as part of the charging controller 2500 of the flyback switching power supply system 300 as shown in FIG. 3 and FIG. 4 according to some embodiments of the present invention. The detection circuit 700 includes comparators 710 and 750, timers 720 and 760, a resistor 730, a clamping circuit 740 (e.g., a damper), and a switch 770. For example, the clamping circuit 740 sets the allowed maximum value for the peak magnitude of the voltage 388 (e.g., $V_{ACD}$) to a predetermined value. In some examples, the detection circuit 700 is configured to detect whether the AC voltage 330 is in a high-voltage state or in a low-voltage state and to also detect whether or not the flyback switching power supply system 300 is unplugged from the voltage supply (e.g., an AC power supply) that provides the AC voltage 330. In certain examples, the detection circuit 700 is used as the detection circuit 418 (e.g., a voltage detector) that generates or receives the voltage 388 (e.g., $V_{ACD}$) and the input signal 488 (e.g., ac_low_ctrl) but not receive the input signal 490 (e.g., vcs_det) and that generates the output signal 482 (e.g., ac_low) and the output signal 484 (e.g., ac_off) but not the output signal 486 (e.g., Rsense_short). Although the above has been shown using a selected group of components for the detection circuit 700 of the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the resistor 730 (e.g., $R_2$) includes two terminals 732 and 734. In some examples, the terminal 732 is connected to the terminal 2520 (e.g., an ACD pin), and the terminal 734 is connected to one terminal of the switch 770 that also includes another terminal biased to the ground voltage on the secondary side of the flyback switching power supply system 300. For example, if the switch 770 is closed, the terminal 734 of the resistor 730 (e.g., $R_2$) is biased to the ground voltage on the secondary side of the flyback switching power supply system 300. In certain examples, the terminal 2520 (e.g., an ACD pin) is also connected to a terminal of the resistor 328 (e.g., $R_1$), which includes another terminal configured to receive the voltage 384 (e.g., $V_D$). For example, the voltage 384 (e.g., $V_D$) represents the effective value (e.g., the RMS) of the AC voltage 330.

According to some embodiments, the switch 770 is a transistor (e.g., a MOS transistor M7) that includes a drain terminal, a source terminal, and a gate terminal. In certain examples, the drain terminal of the transistor 770 is connected to the terminal 734 of the resistor 730 (e.g., $R_2$), and the source terminal of the transistor 770 is biased to the ground voltage on the secondary side of the flyback switching power supply system 300. In some examples, the gate terminal of the transistor 770 receives the input signal 488 (e.g., ac_low_ctrl) from the microcontroller unit (MCU) 420. For example, if the input signal 488 (e.g., ac_low_ctrl) is at a logic high level, the switch 770 is closed (e.g., the transistor 770 being turned on). In another example, if the input signal 488 (e.g., ac_low_ctrl) is at a logic low level, the switch 770 is open (e.g., the transistor 770 being turned off).

In certain embodiments, if the switch 770 is closed, the resistor 328 (e.g., $R_1$) and the resistor 730 (e.g., $R_2$) are parts of a voltage divider that generates the voltage 388 (e.g., $V_{ACD}$). For example, the voltage 388 (e.g., $V_{ACD}$) is determined as follows:

$$V_{ACD} = \frac{R_2}{R_1 + R_2} \times V_D \quad \text{(Equation 9)}$$

where $V_{ACD}$ represents the voltage 388, and $V_D$ represents the voltage 384. Additionally, $R_1$ represents the resistor 328, and $R_2$ represents the resistor 730. As an example, the voltage 388 (e.g., $V_{ACD}$) represents the effective value (e.g., the RMS) of the AC voltage 330.

In some embodiments, the comparator 710 includes a non-inverting input terminal 712 (e.g., a "+" terminal), an inverting input terminal 714 (e.g., a "−" terminal), and an output terminal 716. For example, the non-inverting input terminal 712 (e.g., a "+" terminal) receives a threshold voltage 711 (e.g., $V_{R1}$). As an example, the inverting input terminal 714 (e.g., a "−" terminal) receives the voltage 388 (e.g., $V_{ACD}$). In certain examples, the comparator 710 compares the threshold voltage 711 (e.g., $V_{R1}$) and the voltage 388 (e.g., $V_{ACD}$) and outputs a comparison signal 715 at the output terminal 716.

According to certain embodiments, the comparison signal 715 is received by an input terminal 722 of the timer 720, and in response the timer 720 generates an output signal 782 (e.g., ac_low) at an output terminal 724 of the timer 720. For example, if the comparison signal 715 is at a logic low level, the output signal 782 (e.g., ac_low) is also at the logic low level. As an example, if the comparison signal 715 changes from the logic low level to a logic high level and then remains at the logic high level for at least a predetermined time duration for the timer 720, the output signal 782 (e.g., ac_low) changes from the logic low level to the logic high level. For example, if the comparison signal 715 changes from the logic low level to the logic high level but remains at the logic high level for only a time period that is shorter than the predetermined time duration for the timer 720 before changing from the logic high level back to the logic low level, the output signal 782 (e.g., ac_low) is at the logic low level.

According to some embodiments, the output signal 782 (e.g., ac_low) is used as the output signal 482 (e.g., ac_low) and received by the microcontroller unit (MCU) 420. For example, when the switch 770 is closed by the input signal 488 (e.g., ac_low_ctrl), if the output signal 782 (e.g., ac_low) is at the logic low level, the microcontroller unit (MCU) 420 determines that the AC voltage 330 is in the high-voltage state. As an example, when the switch 770 is closed by the input signal 488 (e.g., ac_low_ctrl), if the output signal 782 (e.g., ac_low) is at the logic high level, the microcontroller unit (MCU) 420 determines that the AC voltage 330 is in the low-voltage state.

In some examples, when the switch 770 is closed by the input signal 488 (e.g., ac_low_ctrl), if the voltage 388 (e.g., $V_{ACD}$) remains lower than the threshold voltage 711 (e.g., $V_{R1}$) during the predetermined time duration for the timer 720, the output signal 782 (e.g., ac_low) is at the logic high level, indicating that the AC voltage 330 is in the low-voltage state. In certain examples, when the switch 770 is closed by the input signal 488 (e.g., ac_low_ctrl), if the voltage 388 (e.g., $V_{ACD}$) becomes higher than the threshold voltage 711 (e.g., $V_{R1}$) at any time during the predetermined time duration for the timer 720, the output signal 782 (e.g., ac_low) is at the logic low level, indicating that the AC voltage 330 is in the high-voltage state.

In certain embodiments, if the switch 770 is open, the clamping circuit 740 sets the peak magnitude of the voltage 388 (e.g., $V_{ACD}$) to a predetermined value. For example, when the switch 770 is open, if the voltage 388 (e.g., $V_{ACD}$) attempts to become larger than the predetermined value (e.g., 5 volts), the clamping circuit 740 sets the voltage 388 (e.g., $V_{ACD}$) to the predetermined value (e.g., 5 volts). As an example, the clamping circuit 740 is a Zener diode that includes a cathode and an anode, where the cathode is connected to the terminal 2520, the inverting input terminal 714 and the non-inverting input terminal 752, and the anode is biased to the ground voltage on the secondary side of the flyback switching power supply system 300. In some examples, the comparator 750 includes a non-inverting input terminal 752 (e.g., a "+" terminal), an inverting input terminal 754 (e.g., a "−" terminal), and an output terminal 756. For example, the non-inverting input terminal 752 (e.g., a "+" terminal) receives the voltage 388 (e.g., $V_{ACD}$). As an example, the inverting input terminal 754 (e.g., a "−" terminal) receives a threshold voltage 751 (e.g., $V_{R2}$). In certain examples, the comparator 750 compares the voltage 388 (e.g., $V_{ACD}$) and the threshold voltage 751 (e.g., $V_{R2}$) and outputs a comparison signal 755 at the output terminal 756.

In some embodiments, the comparison signal 755 is received by an input terminal 762 of the timer 760, and in response the timer 760 generates an output signal 784 (e.g., ac_off) at an output terminal 764 of the timer 760. For example, if the comparison signal 755 is at a logic low level, the output signal 784 (e.g., ac_off) is also at the logic low level. As an example, if the comparison signal 755 changes from the logic low level to a logic high level and then remains at the logic high level for at least a predetermined time duration for the timer 760, the output signal 784 (e.g., ac_off) changes from the logic low level to the logic high level. For example, if the comparison signal 755 changes from the logic low level to the logic high level but remains at the logic high level for only a time period that is shorter than the predetermined time duration for the timer 760 before changing from the logic high level back to the logic low level, the output signal 784 (e.g., ac_off) is at the logic low level.

According to certain embodiments, the output signal 784 (e.g., ac_off) is used as the output signal 484 (e.g., ac_off) and received by the microcontroller unit (MCU) 420. For example, when the switch 770 is open by the input signal 488 (e.g., ac_low_ctrl), if the output signal 784 (e.g., ac_off) is at the logic low level, the microcontroller unit (MCU) 420 determines that the flyback switching power supply system 300 is not unplugged from the voltage supply (e.g., an AC power supply) that provides the AC voltage 330. As an example, when the switch 770 is open by the input signal 488 (e.g., ac_low_ctrl), if the output signal 784 (e.g., ac_off) is at the logic high level, the microcontroller unit (MCU) 420 determines that the flyback switching power supply system 300 is unplugged from the voltage supply (e.g., an AC power supply) that provides the AC voltage 330.

In some examples, when the switch 770 is open by the input signal 488 (e.g., ac_low_ctrl), if the threshold voltage 751 (e.g., Vi) remains lower than the voltage 388 (e.g., $V_{ACD}$) during the predetermined time duration for the timer 760, the output signal 784 (e.g., ac_off) is at the logic high level, indicating that the flyback switching power supply system 300 is unplugged. In certain examples, when the switch 770 is open by the input signal 488 (e.g., ac_low_ctrl), if the threshold voltage 751 (e.g., Vi) becomes higher than the voltage 388 (e.g., $V_{ACD}$) at any time during the predetermined time duration for the timer 760, the output signal 784 (e.g., ac_off) is at the logic low level, indicating that the flyback switching power supply system 300 is not unplugged.

As shown in FIG. 7, the detection circuit 700 is used as the detection circuit 418 to determine whether the AC voltage 330 is in the high-voltage state or in the low-voltage state based at least in part on the comparison signal 715 during the predetermined time duration for the timer 720 when the switch 770 is closed by the input signal 488 (e.g., ac_low_ctrl), and the detection circuit 700 is used as the detection circuit 418 to also determine whether or not the flyback switching power supply system 300 is unplugged from the voltage supply (e.g., an AC power supply) that provides the AC voltage 330, based at least in part on the comparison signal 755 during the predetermined time duration for the timer 760 when the switch 770 is open by the input signal 488 (e.g., ac_low_ctrl) according to some embodiments.

In some examples, when the switch 770 is closed (e.g., when the input signal 488 is at the logic high level), the output signal 782 (e.g., ac_low) is used to determine whether or not the AC voltage 330 is in the high-voltage state or in the low-voltage state. For example, when the input signal 488 (e.g., ac_low_ctrl) is at the logic high level, if the output signal 782 (e.g., ac_low) is at the logic low level, the AC voltage 330 is determined to be in the high-voltage state. As an example, when the input signal 488 (e.g., ac_low_ctrl) is at the logic high level, if the output signal 782 (e.g., ac_low) is at the logic high level, the AC voltage 330 is determined to be in the low-voltage state. In certain examples, when the switch 770 is open (e.g., when the input signal 488 is at the logic low level), the output signal 784 (e.g., ac_off) is used to determine whether or not the flyback switching power supply system 300 is unplugged from the voltage supply (e.g., an AC power supply) that provides the AC voltage 330. For example, when the input signal 488 (e.g., ac_low_ctrl) is at the logic low level, if the output signal 784 (e.g., ac_off) is at the logic low level, the flyback switching power supply system 300 is determined to be not unplugged from the voltage supply (e.g., an AC power supply) that provides the AC voltage 330. As an example, when the input signal 488 (e.g., ac_low_ctrl) is at the logic low level, if the output signal 784 (e.g., ac_off) is at the logic high level, the flyback switching power supply system 300 is determined to be unplugged from the voltage supply (e.g., an AC power supply) that provides the AC voltage 330.

As shown in FIG. 3, if the flyback switching power supply system 300 is determined to be unplugged from the voltage supply (e.g., an AC power supply) that provides the AC voltage 330, the charging controller 2500 (e.g., a chip) communicates with the load 390 (e.g., a Type-C device) through the terminal 2544 (e.g., a CC1 pin), the terminal 2540 (e.g., a CC2 pin), the terminal 2554 (e.g., a DP pin), and/or the terminal 2550 (e.g., a DN pin) according to certain embodiments. For example, the flyback switching power supply system 300 sends one or more notification signals to the load 390 (e.g., a Type-C device) and informs the load 390 (e.g., a Type-C device) that the flyback switching power supply system 300 is unplugged so that the charge indicator of the load 390 (e.g., a Type-C device) does not indicate the load 390 (e.g., a Type-C device) is being charged.

Figure 8:
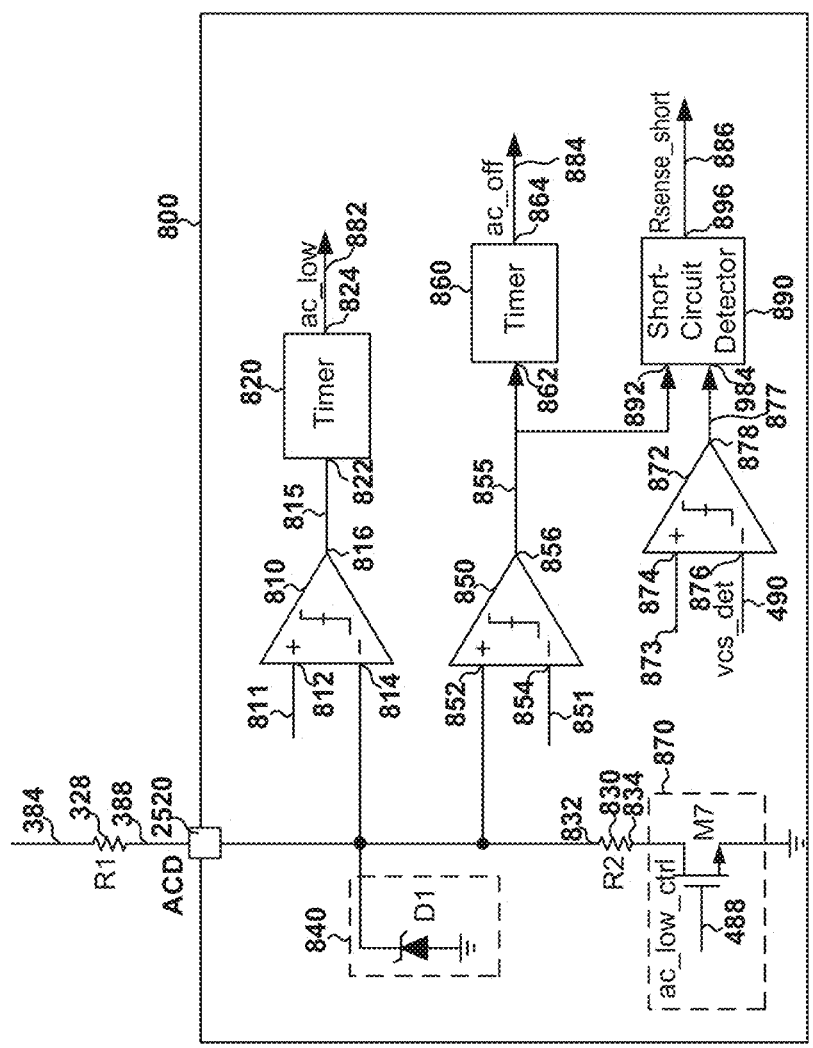
FIG. 8 is a simplified diagram showing certain components of the detection circuit as part of the charging controller of the flyback switching power supply system as shown in FIG. 3 and FIG. 4 according to some embodiments of the present invention.

FIG. 8 is a simplified diagram showing certain components of the detection circuit 800 as part of the charging controller 2500 of the flyback switching power supply system 300 as shown in FIG. 3 and FIG. 4 according to some embodiments of the present invention. The detection circuit 800 includes comparators 810, 850 and 872, timers 820 and 860, a resistor 830, a clamping circuit 840 (e.g., a damper), a switch 870, and a short-circuit detector 890. In some examples, the detection circuit 800 is configured to detect whether the AC voltage 330 is in a high-voltage state or in a low-voltage state, to detect whether or not the flyback switching power supply system 300 is unplugged from the voltage supply (e.g., an AC power supply) that provides the AC voltage 330, and to also detect whether or not the resistor 394 (e.g., $R_{sense}$) is short circuited. In certain examples, the detection circuit 800 is used as the detection circuit 418 (e.g., a voltage detector) that generates or receives the voltage 388 (e.g., $V_{ACD}$), the input signal 488 (e.g., ac_low_ctrl) and the input signal 490 (e.g., vcs_det) and that generates the output signal 482 (e.g., ac_low), the output signal 484 (e.g., ac_off) and the output signal 486 (e.g., Rsense_short). Although the above has been shown using a selected group of components for the detection circuit 800 of the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the resistor 830 (e.g., $R_2$) includes two terminals 832 and 834. In some examples, the terminal 832 is connected to the terminal 2520 (e.g., an ACD pin), and the terminal 834 is connected to one terminal of the switch 870 that also includes another terminal biased to the ground voltage on the secondary side of the flyback switching power supply system 300. For example, if the switch 870 is closed, the terminal 834 of the resistor 830 (e.g., $R_2$) is biased to the ground voltage on the secondary side of the flyback switching power supply system 300. In certain examples, the terminal 2520 (e.g., an ACD pin) is also connected to a terminal of the resistor 328 (e.g., $R_1$), which includes another terminal configured to receive the voltage 384 (e.g., $V_D$). For example, the voltage 384 (e.g., $V_D$) represents the effective value (e.g., the RMS) of the AC voltage 330.

According to some embodiments, the switch 870 is a transistor (e.g., a MOS transistor M7) that includes a drain terminal, a source terminal, and a gate terminal. In certain examples, the drain terminal of the transistor 870 is connected to the terminal 834 of the resistor 830 (e.g., $R_2$), and the source terminal of the transistor 870 is biased to the ground voltage on the secondary side of the flyback switching power supply system 300. In some examples, the gate terminal of the transistor 870 receives the input signal 488 (e.g., ac_low_ctrl) from the microcontroller unit (MCU) 420. For example, if the input signal 488 (e.g., ac_low_ctrl) is at a logic high level, the switch 870 is closed (e.g., the transistor 870 being turned on). In another example, if the input signal 488 (e.g., ac_low_ctrl) is at a logic low level, the switch 870 is open (e.g., the transistor 870 being turned off).

In certain embodiments, if the switch 870 is closed, the resistor 328 (e.g., $R_1$) and the resistor 830 (e.g., $R_2$) are parts of a voltage divider that generates the voltage 388 (e.g., $V_{ACD}$). For example, the voltage 388 (e.g., $V_{ACD}$) is determined as follows:

$$V_{ACD} = \frac{R_2}{R_1 + R_2} \times V_D \qquad \text{(Equation 10)}$$

where $V_{ACD}$ represents the voltage 388, and $V_D$ represents the voltage 384. Additionally, $R_1$ represents the resistor 328, and $R_2$ represents the resistor 830. As an example, the voltage 388 (e.g., $V_{ACD}$) represents the effective value (e.g., the RMS) of the AC voltage 330.

In some embodiments, the comparator 810 includes a non-inverting input terminal 812 (e.g., a "+" terminal), an inverting input terminal 814 (e.g., a "−" terminal), and an output terminal 816. For example, the non-inverting input terminal 812 (e.g., a "+" terminal) receives a threshold voltage 811 (e.g., $V_{R1}$). As an example, the inverting input terminal 814 (e.g., a "−" terminal) receives the voltage 388 (e.g., $V_{ACD}$). In certain examples, the comparator 810 compares the threshold voltage 811 (e.g., $V_{R1}$) and the voltage 388 (e.g., $V_{ACD}$) and outputs a comparison signal 815 at the output terminal 816.

According to certain embodiments, the comparison signal 815 is received by an input terminal 822 of the timer 820, and in response the timer 820 generates an output signal 882 (e.g., ac_low) at an output terminal 824 of the timer 820. For example, if the comparison signal 815 is at a logic low level, the output signal 882 (e.g., ac_low) is also at the logic low level. As an example, if the comparison signal 815 changes from the logic low level to a logic high level and then remains at the logic high level for at least a predetermined time duration for the timer 820, the output signal 882 (e.g., ac_low) changes from the logic low level to the logic high level. For example, if the comparison signal 815 changes from the logic low level to the logic high level but remains at the logic high level for only a time period that is shorter than the predetermined time duration for the timer 820 before changing from the logic high level back to the logic low level, the output signal 882 (e.g., ac_low) is at the logic low level.

According to some embodiments, the output signal 882 (e.g., ac_low) is used as the output signal 482 (e.g., ac_low) and received by the microcontroller unit (MCU) 420. For example, when the switch 870 is closed by the input signal 488 (e.g., ac_low_ctrl), if the output signal 882 (e.g., ac_low) is at the logic low level, the microcontroller unit (MCU) 420 determines the AC voltage 330 is in the high-voltage state. As an example, when the switch 870 is closed by the input signal 488 (e.g., ac_low_ctrl), if the output signal 882 (e.g., ac_low) is at the logic high level, the microcontroller unit (MCU) 420 determines that the AC voltage 330 is in the low-voltage state.

In some examples, when the switch 870 is closed by the input signal 488 (e.g., ac_low_ctrl), if the voltage 388 (e.g., $V_{ACD}$) remains lower than the threshold voltage 811 (e.g., $V_{R1}$) during the predetermined time duration for the timer 820, the output signal 882 (e.g., ac_low) is at the logic high level, indicating that the AC voltage 330 is in the low-voltage state. In certain examples, when the switch 870 is closed by the input signal 488 (e.g., ac_low_ctrl), if the voltage 388 (e.g., $V_{ACD}$) becomes higher than the threshold voltage 811 (e.g., $V_{R1}$) at any time during the predetermined time duration for the timer 820, the output signal 882 (e.g., ac_low) is at the logic low level, indicating that the AC voltage 330 is in the high-voltage state.

In certain embodiments, if the switch 870 is open, the clamping circuit 840 sets the peak magnitude of the voltage 388 (e.g., $V_{ACD}$) to a predetermined value. For example, when the switch 870 is open, if the voltage 388 (e.g., $V_{ACD}$) attempts to become larger than the predetermined value (e.g., 5 volts), the clamping circuit 840 sets the voltage 388 (e.g., $V_{ACD}$) to the predetermined value (e.g., 5 volts). As an example, the clamping circuit 840 is a Zener diode that includes a cathode and an anode, where the cathode is connected to the terminal 2520, the inverting input terminal 814 and the non-inverting input terminal 852, and the anode is biased to the ground voltage on the secondary side of the flyback switching power supply system 300. In some examples, the comparator 850 includes a non-inverting input terminal 852 (e.g., a "+" terminal), an inverting input terminal 854 (e.g., a "−" terminal), and an output terminal 856. For example, the non-inverting input terminal 852 (e.g., a "+" terminal) receives the voltage 388 (e.g., $V_{ACD}$). As an example, the inverting input terminal 854 (e.g., a "−" terminal) receives a threshold voltage 851 (e.g., $V_{R2}$). In certain examples, the comparator 850 compares the voltage 388 (e.g., $V_{ACD}$) and the threshold voltage 851 (e.g., $V_{R2}$) and outputs a comparison signal 855 at the output terminal 856.

In some embodiments, the comparison signal 855 is received by an input terminal 862 of the timer 860, and in response the timer 860 generates an output signal 884 (e.g., ac_off) at an output terminal 864 of the timer 860. For example, if the comparison signal 855 is at a logic low level, the output signal 884 (e.g., ac_off) is also at the logic low level. As an example, if the comparison signal 855 changes from the logic low level to a logic high level and then remains at the logic high level for at least a predetermined time duration for the timer 860, the output signal 884 (e.g., ac_off) changes from the logic low level to the logic high level. For example, if the comparison signal 855 changes from the logic low level to the logic high level but remains at the logic high level for only a time period that is shorter than the predetermined time duration for the timer 860 before changing from the logic high level back to the logic low level, the output signal 884 (e.g., ac_off) is at the logic low level.

According to certain embodiments, the output signal 884 (e.g., ac_off) is used as the output signal 484 (e.g., ac_off) and received by the microcontroller unit (MCU) 420. For example, when the switch 870 is open by the input signal 488 (e.g., ac_low_ctrl), if the output signal 884 (e.g., ac_off) is at the logic low level, the microcontroller unit (MCU) 420 determines that the flyback switching power supply system 300 is not unplugged from the voltage supply (e.g., an AC power supply) that provides the AC voltage 330. As an example, when the switch 870 is open by the input signal 488 (e.g., ac_low_ctrl), if the output signal 884 (e.g., ac_off) is at the logic high level, the microcontroller unit (MCU) 420 determines that the flyback switching power supply system 300 is unplugged from the voltage supply (e.g., an AC power supply) that provides the AC voltage 330. In some examples, when the switch 870 is open by the input signal 488 (e.g., ac_low_ctrl), if the threshold voltage 851 (e.g., $V_{R2}$) remains lower than the voltage 388 (e.g., $V_{ACD}$) during the predetermined time duration for the timer 860, the output signal 884 (e.g., ac_off) is at the logic high level, indicating that the flyback switching power supply system 300 is unplugged. In certain examples, when the switch 870 is open by the input signal 488 (e.g., ac_low_ctrl), if the threshold voltage 851 (e.g., $V_{R2}$) becomes higher than the voltage 388 (e.g., $V_{ACD}$) at any time during the predetermined time duration for the timer 860, the output signal 884 (e.g., ac_off) is at the logic low level, indicating that the flyback switching power supply system 300 is not unplugged.

As shown in FIG. 4, the output current amplifier 434 (e.g., AVCCR) includes the non-inverting input terminal (e.g., a "+" terminal) coupled to the terminal 2564 (e.g., an ISP pin) and also includes an inverting input terminal (e.g., a "−" terminal) coupled to the terminal 2570 (e.g., an ISN pin) according to certain embodiments. For example, as shown in FIG. 3, the terminal 2564 (e.g., an ISP pin) is connected to one terminal of the resistor 394 (e.g., $R_{sense}$), and the terminal 2570 (e.g., an ISN pin) is connected to another terminal of the resistor 394 (e.g., $R_{sense}$). As an example, the output current amplifier 434 (e.g., AVCCR) generates the input signal 490 (e.g., vcs_det) based at least in part on the resistance of the resistor 394 (e.g., $R_{sense}$), and the input signal 490 (e.g., vcs_det) is received by the detection circuit 800 used as the detection circuit 418.

As shown in FIG. 8, the comparator 872 includes a non-inverting input terminal 874 (e.g., a "+" terminal) and an inverting input terminal 876 (e.g., a "−" terminal) according to some embodiments. In certain examples, the non-inverting input terminal 874 (e.g., a "+" terminal) receives a threshold voltage 873 (e.g., $V_{R3}$), and the inverting input terminal 876 (e.g., a "−" terminal) receives the input signal 490 (e.g., vcs_det). In some examples, the comparator 872 compares the threshold voltage 873 (e.g., $V_{R3}$) and the input signal 490 (e.g., vcs_det) and outputs a comparison signal 877 at the output terminal 878. For example, if the input signal 490 (e.g., vcs_det) is lower than the threshold voltage 873 (e.g., $V_{R3}$), the comparison signal 877 is at a logic high level. As an example, if the input signal 490 (e.g., vcs_det) is higher than the threshold voltage 873 (e.g., $V_{R3}$), the comparison signal 877 is at a logic low level.

In certain embodiments, the comparison signal 855 is received by the timer 860 and the short-circuit detector 890. For example, the short-circuit detector 890 also receives the comparison signal 877. As an example, when the switch 870 is open by the input signal 488 (e.g., ac_low_ctrl), the short-circuit detector 890 generate the output signal 886 (e.g., Rsense_short), which indicates whether or not the resistor 394 (e.g., $R_{sense}$) is short circuited. In some examples, the output signal 886 (e.g., Rsense_short) is used as the output signal 486 (e.g., Rsense_short) and received by the microcontroller unit (MCU) 420. For example, when the switch 870 is open by the input signal 488 (e.g., ac_low_ctrl), if the output signal 886 (e.g., Rsense_short) is at a logic high level, the microcontroller unit (MCU) 420 determines that the resistor 394 (e.g., $R_{sense}$) is short circuited. As an example, when the switch 870 is open by the input signal 488 (e.g., ac_low_ctrl), if the output signal 886 (e.g., Rsense_short) is at a logic low level, the microcontroller unit (MCU) 420 determines that the resistor 394 (e.g., $R_{sense}$) is not short circuited.

In some embodiments, when the switch 870 is open by the input signal 488 (e.g., ac_low_ctrl), the short-circuit detector 890 uses the comparison signal 855 to determine the cycle frequency of the drive signal 382 (e.g., a PWM signal) and then uses the determined cycle frequency and the comparison signal 877 to generate the output signal 886 (e.g., Rsense_short), which indicates whether or not the resistor 394 (e.g., $R_{sense}$) is short circuited. In certain examples, when the switch 870 is open by the input signal 488 (e.g., ac_low_ctrl), the short-circuit detector 890 determines the cycle frequency of the drive signal 382 (e.g., a PWM signal) based at least in part on the comparison signal 855 and also determines whether the cycle frequency of the drive signal 382 (e.g., a PWM signal) exceeds a predetermined frequency threshold (e.g., 40 KHz). For example, when the switch 870 is open by the input signal 488 (e.g., ac_low_ctrl), if the cycle frequency of the drive signal 382 (e.g., a PWM signal) is higher than the predetermined frequency threshold (e.g., 40 KHz) and the input signal 490 (e.g., vcs_det) is lower than the threshold voltage 873 (e.g., $V_{R3}$), the short-circuit detector 890 generate the output signal 886 (e.g., Rsense_short) to indicate that the resistor 394 (e.g., $R_{sense}$) is short circuited. As an example, when the switch 870 is open by the input signal 488 (e.g., ac_low_ctrl), if the cycle frequency of the drive signal 382 (e.g., a PWM signal) is lower than the predetermined frequency threshold (e.g., 40 KHz) and/or the input signal 490 (e.g., vcs_det) is higher than the threshold voltage 873 (e.g., $V_{R3}$), the short-circuit detector 890 generate the output signal 886 (e.g., Rsense_short) to indicate that the resistor 394 (e.g., $R_{sense}$) is not short circuited.

As shown in FIG. 8, the detection circuit 800 is used as the detection circuit 418 to determine whether the AC voltage 330 is in the high-voltage state or in the low-voltage state based at least in part on the comparison signal 815 during the predetermined time duration for the timer 820 when the switch 870 is closed by the input signal 488 (e.g., ac_low_ctrl), the detection circuit 800 is used as the detection circuit 418 to determine whether or not the flyback switching power supply system 300 is unplugged from the voltage supply (e.g., an AC power supply) that provides the AC voltage 330, based at least in part on the comparison signal 855 during the predetermined time duration for the timer 860 when the switch 870 is open by the input signal 488 (e.g., ac_low_ctrl), and the detection circuit 800 is used as the detection circuit 418 to determine whether or not the resistor 394 (e.g., $R_{sense}$) is short circuited based at least in part on the comparison signals 855 and 877 when the switch 870 is open by the input signal 488 (e.g., ac_low_ctrl) according to certain embodiments.

In some examples, when the switch 870 is closed (e.g., when the input signal 488 is at the logic high level), the output signal 882 (e.g., ac_low) is used to determine whether or not the AC voltage 330 is in the high-voltage state or in the low-voltage state. For example, when the input signal 488 (e.g., ac_low_ctrl) is at the logic high level, if the output signal 882 (e.g., ac_low) is at the logic low level, the AC voltage 330 is determined to be in the high-voltage state. As an example, when the input signal 488 (e.g., ac_low_ctrl) is at the logic high level, if the output signal 882 (e.g., ac_low) is at the logic high level, the AC voltage 330 is determined to be in the low-voltage state. In certain examples, when the switch 870 is open (e.g., when the input signal 488 is at the logic low level), the output signal 884 (e.g., ac_off) is used to determine whether or not the flyback switching power supply system 300 is unplugged from the AC power supply. For example, when the input signal 488 (e.g., ac_low_ctrl) is at the logic low level, if the output signal 884 (e.g., ac_off) is at the logic low level, the flyback switching power supply system 300 is determined to be not unplugged from the voltage supply (e.g., an AC power supply) that provides the AC voltage 330. As an example, when the input signal 488 (e.g., ac_low_ctrl) is at the logic low level, if the output signal 884 (e.g., ac_off) is at the logic high level, the flyback switching power supply system 300 is determined to be unplugged from the voltage supply (e.g., an AC power supply) that provides the AC voltage 330. In some examples, when the switch 870 is open (e.g., when the input signal 488 is at the logic low level), the output signal 886 (e.g., $R_{sense}$_short) is used to determine whether or not the resistor 394 (e.g., $R_{sense}$) is short circuited. For example, when the input signal 488 (e.g., ac_low_ctrl) is at the logic low level, if the output signal 886 (e.g., $R_{sense}$_short) is at the logic high level, the resistor 394 (e.g., $R_{sense}$) is determined to be short circuited. As an example, when the input signal 488 (e.g., ac_low_ctrl) is at the logic low level, if the output signal 886 (e.g., $R_{sense}$_short) is at the logic low level, the resistor 394 (e.g., $R_{sense}$) is determined to be not short circuited.

As shown in FIG. 3, the detection circuit 800 is used as the detection circuit 418 to send the output signal 882 (e.g., ac_low) as the output signal 482 (e.g., ac_low), the output signal 884 (e.g., ac_off) as the output signal 484 (e.g., ac_off), and the output signal 886 (e.g., $R_{sense}$_short) as the output signal 486 (e.g., $R_{sense}$_short), to the microcontroller unit (MCU) 420 according to some embodiments. In certain examples, if the output signal 886 (e.g., $R_{sense}$_short) indicates that the resistor 394 (e.g., $R_{sense}$) is short circuited, the transistor 340 (e.g., a transistor M4) is turned off by the drive signal generated by the gate driver 422 and received through the terminal 2560 (e.g., a GATE pin). As an example, if the output signal 886 (e.g., $R_{sense}$_short) indicates that the resistor 394 (e.g., $R_{sense}$) is short circuited, the flyback switching power supply system 300 (e.g., a power converter) reduces the output current 398 (e.g., $I_o$) to the load 390 (e.g., a Type-C device) to zero by turning off the transistor 340 (e.g., a transistor M4).

Figure 9:
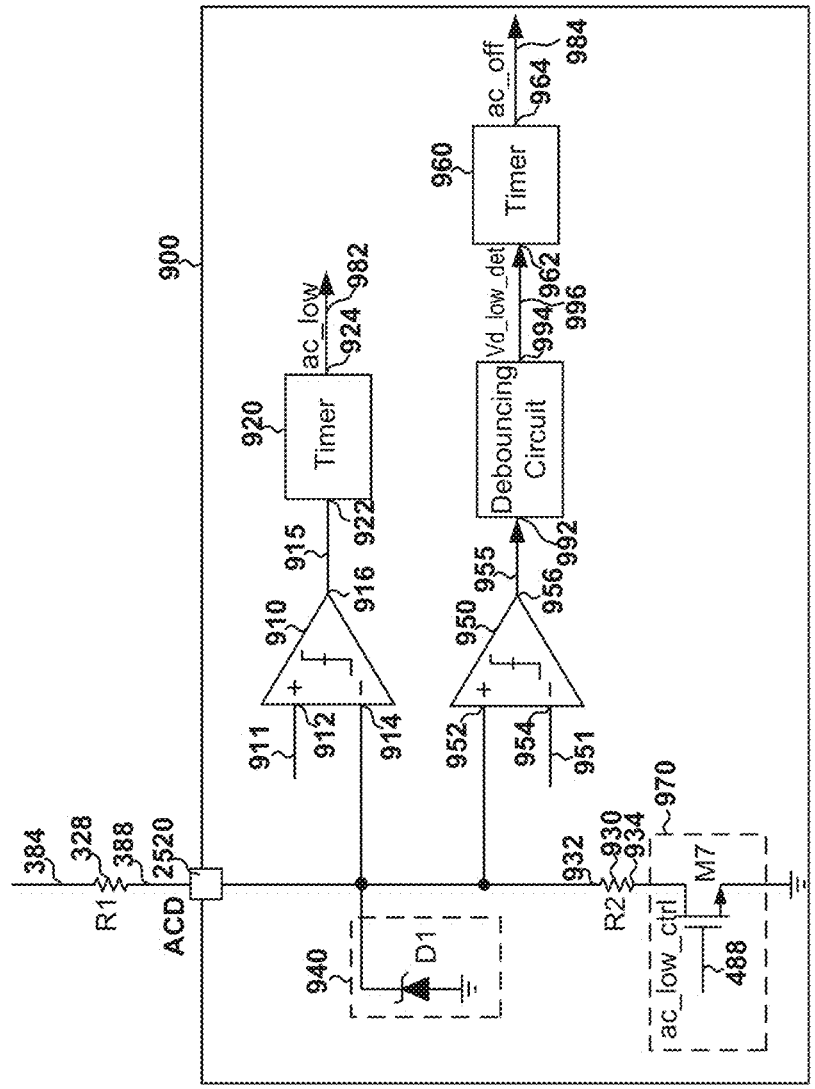
FIG. 9 is a simplified diagram showing certain components of the detection circuit as part of the charging controller of the flyback switching power supply system as shown in FIG. 3 and FIG. 4 according to some embodiments of the present invention.

FIG. 9 is a simplified diagram showing certain components of the detection circuit 900 as part of the charging controller 2500 of the flyback switching power supply system 300 as shown in FIG. 3 and FIG. 4 according to some embodiments of the present invention. The detection circuit 900 includes comparators 910 and 950, timers 920 and 960, a resistor 930, a clamping circuit 940 (e.g., a damper), a switch 970, and a debouncing circuit 990. In some examples, the detection circuit 900 is configured to detect whether the AC voltage 330 is in a high-voltage state or in a low-voltage state and to also detect whether or not the flyback switching power supply system 300 is unplugged from the voltage supply (e.g., an AC power supply) that provides the AC voltage 330. In certain examples, the detection circuit 900 is used as the detection circuit 418 that generates or receives the voltage 388 (e.g., $V_{ACD}$) and the input signal 488 (e.g., ac_low_ctrl) but not receive the input signal 490 (e.g., vcs_det) and that generates the output signal 482 (e.g., ac_low) and the output signal 484 (e.g., ac_off) but not the output signal 486 (e.g., $R_{sense}$_short). Although the above has been shown using a selected group of components for the detection circuit 900 of the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the resistor 930 (e.g., $R_2$) includes two terminals 932 and 934. In some examples, the terminal 932 is connected to the terminal 2520 (e.g., an ACD pin), and the terminal 934 is connected to one terminal of the switch 970 that also includes another terminal biased to the ground voltage on the secondary side of the flyback switching power supply system 300. For example, if the switch 970 is closed, the terminal 934 of the resistor 930 (e.g., $R_2$) is biased to the ground voltage on the secondary side of the flyback switching power supply system 300. In certain examples, the terminal 2520 (e.g., an ACD pin) is also connected to a terminal of the resistor 328 (e.g., $R_1$), which includes another terminal configured to receive the voltage 384 (e.g., $V_D$). For example, the voltage 384 (e.g., $V_D$) represents the effective value (e.g., the RMS) of the AC voltage 330.

According to some embodiments, the switch 970 is a transistor (e.g., a MOS transistor M7) that includes a drain terminal, a source terminal, and a gate terminal. In certain examples, the drain terminal of the transistor 970 is connected to the terminal 934 of the resistor 930 (e.g., $R_2$), and the source terminal of the transistor 970 is biased to the ground voltage on the secondary side of the flyback switching power supply system 300. In some examples, the gate terminal of the transistor 970 receives the input signal 488 (e.g., ac_low_ctrl) from the microcontroller unit (MCU) 420. For example, if the input signal 488 (e.g., ac_low_ctrl) is at a logic high level, the switch 970 is closed (e.g., the transistor 970 being turned on). In another example, if the input signal 488 (e.g., ac_low_ctrl) is at a logic low level, the switch 970 is open (e.g., the transistor 970 being turned off).

In certain embodiments, if the switch 970 is closed, the resistor 328 (e.g., $R_1$) and the resistor 930 (e.g., $R_2$) are parts of a voltage divider that generates the voltage 388 (e.g., $V_{ACD}$). For example, the voltage 388 (e.g., $V_{ACD}$) is determined as follows:

$$V_{ACD} = \frac{R_2}{R_1 + R_2} \times V_D \qquad \text{(Equation 11)}$$

where $V_{ACD}$ represents the voltage 388, and $V_D$ represents the voltage 384. Additionally, $R_1$ represents the resistor 328, and $R_2$ represents the resistor 930. As an example, the voltage 388 (e.g., $V_{ACD}$) represents the effective value (e.g., the RMS) of the AC voltage 330.

In some embodiments, the comparator 910 includes a non-inverting input terminal 912 (e.g., a "+" terminal), an inverting input terminal 914 (e.g., a "−" terminal), and an output terminal 916. For example, the non-inverting input terminal 912 (e.g., a "+" terminal) receives a threshold voltage 911 (e.g., $V_{R1}$). As an example, the inverting input terminal 914 (e.g., a "−" terminal) receives the voltage 388 (e.g., $V_{ACD}$). In certain examples, the comparator 910 compares the threshold voltage 911 (e.g., $V_{R1}$) and the voltage 388 (e.g., $V_{ACD}$) and outputs a comparison signal 915 at the output terminal 916.

According to certain embodiments, the comparison signal 915 is received by the timer 920, which in response generates an output signal 982 (e.g., ac_low). For example, if the comparison signal 915 is at a logic low level, the output signal 982 (e.g., ac_low) is also at the logic low level. As an example, if the comparison signal 915 changes from the logic low level to a logic high level and then remains at the logic high level for at least a predetermined time duration for the timer 920, the output signal 982 (e.g., ac_low) changes from the logic low level to the logic high level. For example, if the comparison signal 915 changes from the logic low level to the logic high level but remains at the logic high level for only a time period that is shorter than the predetermined time duration for the timer 920 before changing from the logic high level back to the logic low level, the output signal 982 (e.g., ac_low) is at the logic low level.

According to some embodiments, the output signal 982 (e.g., ac_low) is used as the output signal 482 (e.g., ac_low) and received by the microcontroller unit (MCU) 420. For example, when the switch 970 is closed by the input signal 488 (e.g., ac_low_ctrl), if the output signal 982 (e.g., ac_low) is at the logic low level, the microcontroller unit (MCU) 420 determines that the AC voltage 330 is in the high-voltage state. As an example, when the switch 970 is closed by the input signal 488 (e.g., ac_low_ctrl), if the output signal 982 (e.g., ac_low) is at the logic high level, the microcontroller unit (MCU) 420 determines that the AC voltage 330 is in the low-voltage state.

In some examples, when the switch 970 is closed by the input signal 488 (e.g., ac_low_ctrl), if the voltage 388 (e.g., $V_{ACD}$) remains lower than the threshold voltage 911 (e.g., $V_{R1}$) during the predetermined time duration for the timer 920, the output signal 982 (e.g., ac_low) is at the logic high level, indicating that the AC voltage 330 is in the low-voltage state. In certain examples, when the switch 970 is closed by the input signal 488 (e.g., ac_low_ctrl), if the voltage 388 (e.g., $V_{ACD}$) becomes higher than the threshold voltage 911 (e.g., $V_{R1}$) at any time during the predetermined time duration for the timer 920, the output signal 982 (e.g., ac_low) is at the logic low level, indicating that the AC voltage 330 is in the high-voltage state.

In certain embodiments, if the switch 970 is open, the clamping circuit 940 sets the peak magnitude of the voltage 388 (e.g., $V_{ACD}$) to a predetermined value. For example, when the switch 970 is open, if the voltage 388 (e.g., $V_{ACD}$) attempts to become larger than the predetermined value (e.g., 5 volts), the clamping circuit 940 sets the voltage 388 (e.g., $V_{ACD}$) to the predetermined value (e.g., 5 volts). As an example, the clamping circuit 940 is a Zener diode that includes a cathode and an anode, where the cathode is connected to the terminal 2520, the inverting input terminal 914 and the non-inverting input terminal 952, and the anode is biased to the ground voltage on the secondary side of the flyback switching power supply system 300. In some examples, the comparator 950 includes a non-inverting input terminal 952 (e.g., a "+" terminal), an inverting input terminal 954 (e.g., a "−" terminal), and an output terminal 956. For example, the non-inverting input terminal 952 (e.g., a "+" terminal) receives the voltage 388 (e.g., $V_{ACD}$). As an example, the inverting input terminal 954 (e.g., a "−" terminal) receives a threshold voltage 951 (e.g., $V_{R2}$). In certain examples, the comparator 950 compares the voltage 388 (e.g., $V_{ACD}$) and the threshold voltage 951 (e.g., $V_{R2}$) and outputs a comparison signal 955 at the output terminal 956.

In some embodiments, the comparison signal 955 is received by an input terminal 992 of the debouncing circuit 990, and in response the debouncing circuit 990 generates a signal 996 (e.g., Vd_low_det) at an output terminal 994 of the debouncing circuit 990. In certain examples, the debouncing circuit 990 uses a debouncing time constant (e.g., $T_d$) to perform a debouncing process on the comparison signal 955. For example, the debouncing time constant (e.g., 10) is longer than a cycle period of certain oscillation rings in the comparison signal 955 so that these oscillation rings are removed after the debouncing process is performed. As an example, the removal of these oscillation rings improves accuracy of the determination whether or not the flyback switching power supply system 300 is unplugged from the voltage supply (e.g., an AC power supply) that provides the AC voltage 330.

According to some embodiments, the signal 996 (e.g., Vd_low_det) is received by the timer 960, which in response generates an output signal 984 (e.g., ac_off). For example, if the signal 996 (e.g., Vd_low_det) is at a logic low level, the output signal 984 (e.g., ac_off) is also at the logic low level. As an example, if the signal 996 (e.g., Vd_low_det) changes from the logic low level to a logic high level and then remains at the logic high level for at least a predetermined time duration (e.g., two seconds) for the timer 960, the output signal 984 (e.g., ac_off) changes from the logic low level to the logic high level. For example, if the signal 996 (e.g., Vd_low_det) changes from the logic low level to the logic high level but remains at the logic high level for only a time period that is shorter than the predetermined time duration for the timer 960 before changing from the logic high level back to the logic low level, the output signal 984 (e.g., ac_off) is at the logic low level.

According to certain embodiments, the output signal 984 (e.g., ac_off) is used as the output signal 484 (e.g., ac_off) and received by the microcontroller unit (MCU) 420. For example, when the switch 970 is open by the input signal 488 (e.g., ac_low_ctrl), if the output signal 984 (e.g., ac_off) is at the logic low level, the microcontroller unit (MCU) 420 determines that the flyback switching power supply system 300 is not unplugged from the voltage supply (e.g., an AC power supply) that provides the AC voltage 330. As an example, when the switch 970 is open by the input signal 488 (e.g., ac_low_ctrl), if the output signal 984 (e.g., ac_off) is at the logic high level, the microcontroller unit (MCU) 420 determines that the flyback switching power supply system 300 is unplugged from the voltage supply (e.g., an AC power supply) that provides the AC voltage 330.

In some examples, when the switch 970 is open by the input signal 488 (e.g., ac_low_ctrl), if the threshold voltage 951 (e.g., Vi) remains lower than the voltage 388 (e.g., $V_{ACD}$) during the predetermined time duration (e.g., two seconds) for the timer 960, the output signal 984 (e.g., ac_off) is at the logic high level, indicating that the flyback switching power supply system 300 is unplugged. In certain examples, when the switch 970 is open by the input signal 488 (e.g., ac_low_ctrl), if the threshold voltage 951 (e.g., $V_{R2}$) becomes higher than the voltage 388 (e.g., $V_{ACD}$) at any time during the predetermined time duration (e.g., two seconds) for the timer 960, the output signal 984 (e.g., ac_off) is at the logic low level, indicating that the flyback switching power supply system 300 is not unplugged.

As shown in FIG. 9, the detection circuit 900 is used as the detection circuit 418 (e.g., a voltage detector) to determine whether the AC voltage 330 is in the high-voltage state or in the low-voltage state based at least in part on the signal 996 (e.g., Vd_low_det) during the predetermined time duration for the timer 920 when the switch 970 is closed by the input signal 488 (e.g., ac_low_ctrl), and the detection circuit 900 is used as the detection circuit 418 to also determine whether or not the flyback switching power supply system 300 is unplugged from the voltage supply (e.g., an AC power supply) that provides the AC voltage 330, based at least in part on the signal 996 (e.g., Vd_low_det) during the predetermined time duration (e.g., two seconds) for the timer 960 when the switch 970 is open by the input signal 488 (e.g., ac_low_ctrl) according to some embodiments.

In some examples, when the switch 970 is closed (e.g., when the input signal 488 is at the logic high level), the output signal 982 (e.g., ac_low) is used to determine whether or not the AC voltage 330 is in the high-voltage state or in the low-voltage state. For example, when the input signal 488 (e.g., ac_low_ctrl) is at the logic high level, if the output signal 982 (e.g., ac_low) is at the logic low level, the AC voltage 330 is determined to be in the high-voltage state. As an example, when the input signal 488 (e.g., ac_low_ctrl) is at the logic high level, if the output signal 982 (e.g., ac_low) is at the logic high level, the AC voltage 330 is determined to be in the low-voltage state. In certain examples, when the switch 970 is open (e.g., when the input signal 488 is at the logic low level), the output signal 984 (e.g., ac_off) is used to determine whether or not the flyback switching power supply system 300 is unplugged from the voltage supply (e.g., an AC power supply) that provides the AC voltage 330. For example, when the input signal 488 (e.g., ac_low_ctrl) is at the logic low level, if the output signal 984 (e.g., ac_off) is at the logic low level, the flyback switching power supply system 300 is determined to be not unplugged from the voltage supply (e.g., an AC power supply) that provides the AC voltage 330. As an example, when the input signal 488 (e.g., ac_low_ctrl) is at the logic low level, if the output signal 984 (e.g., ac_off) is at the logic high level, the flyback switching power supply system 300 is determined to be unplugged from the voltage supply (e.g., an AC power supply) that provides the AC voltage 330.

As shown in FIG. 3, if the flyback switching power supply system 300 is determined to be unplugged from the voltage supply (e.g., an AC power supply) that provides the AC voltage 330, the charging controller 2500 (e.g., a chip) communicates with the load 390 (e.g., a Type-C device) through the terminal 2544 (e.g., a CC1 pin), the terminal 2540 (e.g., a CC2 pin), the terminal 2554 (e.g., a DP pin), and/or the terminal 2550 (e.g., a DN pin) according to certain embodiments. For example, the flyback switching power supply system 300 sends one or more notification signals to the load 390 (e.g., a Type-C device) and informs the load 390 (e.g., a Type-C device) that the flyback switching power supply system 300 is unplugged so that the charge indicator of the load 390 (e.g., a Type-C device) does not indicate the load 390 (e.g., a Type-C device) is being charged.

Figure 10:
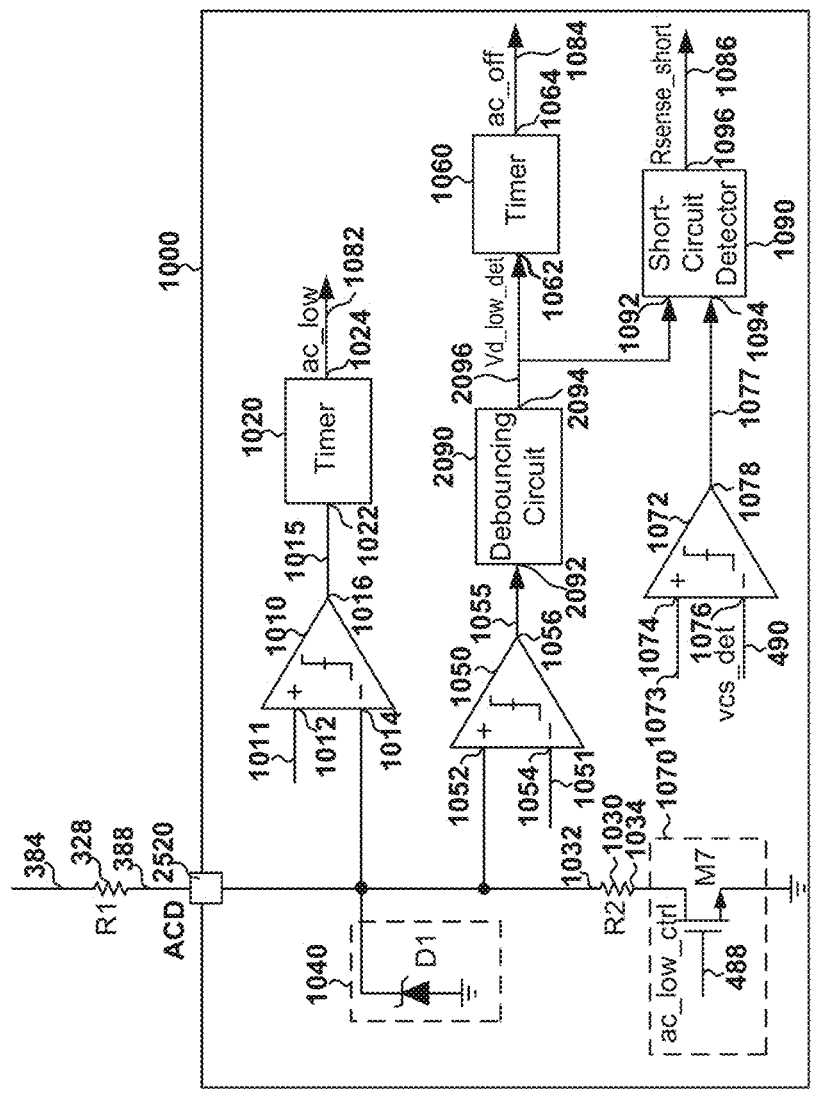
FIG. 10 is a simplified diagram showing certain components of the detection circuit as part of the charging controller of the flyback switching power supply system as shown in FIG. 3 and FIG. 4 according to some embodiments of the present invention.

FIG. 10 is a simplified diagram showing certain components of the detection circuit 1000 as part of the charging controller 2500 of the flyback switching power supply system 300 as shown in FIG. 3 and FIG. 4 according to some embodiments of the present invention. The detection circuit 1000 includes comparators 1010, 1050 and 1072, timers 1020 and 1060, a resistor 1030, a clamping circuit 1040 (e.g., a damper), a switch 1070, a short-circuit detector 1090, and a debouncing circuit 2090. In some examples, the detection circuit 1000 is configured to detect whether the AC voltage 330 is in a high-voltage state or in a low-voltage state, to detect whether or not the flyback switching power supply system 300 is unplugged from the voltage supply (e.g., an AC power supply) that provides the AC voltage 330, and to also detect whether or not the resistor 394 (e.g., $R_{sense}$) is short circuited. In certain examples, the detection circuit 1000 is used as the detection circuit 418 (e.g., a voltage detector) that generates or receives the voltage 388 (e.g., $V_{ACD}$), the input signal 488 (e.g., ac_low_ctrl) and the input signal 490 (e.g., vcs_det) and that generates the output signal 482 (e.g., ac_low), the output signal 484 (e.g., ac_off) and the output signal 486 (e.g., Rsense_short). Although the above has been shown using a selected group of components for the detection circuit 1000 of the charging controller 2500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the resistor 1030 (e.g., $R_2$) includes two terminals 1032 and 1034. In some examples, the terminal 1032 is connected to the terminal 2520 (e.g., an ACD pin), and the terminal 1034 is connected to one terminal of the switch 1070 that also includes another terminal biased to the ground voltage on the secondary side of the flyback switching power supply system 300. For example, if the switch 1070 is closed, the terminal 1034 of the resistor 1030 (e.g., $R_2$) is biased to the ground voltage on the secondary side of the flyback switching power supply system 300. In certain examples, the terminal 2520 (e.g., an ACD pin) is also connected to a terminal of the resistor 328 (e.g., $R_1$), which includes another terminal configured to receive the voltage 384 (e.g., $V_D$). For example, the voltage 384 (e.g., $V_D$) represents the effective value (e.g., the RMS) of the AC voltage 330.

According to some embodiments, the switch 1070 is a transistor (e.g., a MOS transistor M7) that includes a drain terminal, a source terminal, and a gate terminal. In certain examples, the drain terminal of the transistor 1070 is connected to the terminal 1034 of the resistor 1030 (e.g., $R_2$), and the source terminal of the transistor 1070 is biased to the ground voltage on the secondary side of the flyback switching power supply system 300. In some examples, the gate terminal of the transistor 1070 receives the input signal 488 (e.g., ac_low_ctrl) from the microcontroller unit (MCU) 420. For example, if the input signal 488 (e.g., ac_low_ctrl) is at a logic high level, the switch 1070 is closed (e.g., the transistor 1070 being turned on). In another example, if the input signal 488 (e.g., ac_low_ctrl) is at a logic low level, the switch 1070 is open (e.g., the transistor 1070 being turned off).

In certain embodiments, if the switch 1070 is closed, the resistor 328 (e.g., $R_1$) and the resistor 1030 (e.g., $R_2$) are parts of a voltage divider that generates the voltage 388 (e.g., $V_{ACD}$). For example, the voltage 388 (e.g., $V_{ACD}$) is determined as follows:

$$V_{ACD} = \frac{R_2}{R_1 + R_2} \times V_D \qquad \text{(Equation 12)}$$

where $V_{ACD}$ represents the voltage 388, and $V_D$ represents the voltage 384. Additionally, $R_1$ represents the resistor 328, and $R_2$ represents the resistor 1030. As an example, the voltage 388 (e.g., $V_{ACD}$) represents the effective value (e.g., the RMS) of the AC voltage 330.

In some embodiments, the comparator 1010 includes a non-inverting input terminal 1012 (e.g., a "+" terminal), an inverting input terminal 1014 (e.g., a "−" terminal), and an output terminal 1016. For example, the non-inverting input terminal 1012 (e.g., a "+" terminal) receives a threshold voltage 1011 (e.g., As an example, the inverting input terminal 1014 (e.g., a "−" terminal) receives the voltage 388 (e.g., $V_{ACD}$). In certain examples, the comparator 1010 compares the threshold voltage 1011 (e.g., $V_{R1}$) and the voltage 388 (e.g., $V_{ACD}$) and outputs a comparison signal 1015 at the output terminal 1016.

According to certain embodiments, the comparison signal 1015 is received by an input terminal 1022 of the timer 1020, and in response the timer 1020 generates an output signal 1082 (e.g., ac_low) at an output terminal 1024 of the timer 1020. For example, if the comparison signal 1015 is at a logic low level, the output signal 1082 (e.g., ac_low) is also at the logic low level. As an example, if the comparison signal 1015 changes from the logic low level to a logic high level and then remains at the logic high level for at least a predetermined time duration for the timer 1020, the output signal 1082 (e.g., ac_low) changes from the logic low level to the logic high level. For example, if the comparison signal 1015 changes from the logic low level to the logic high level but remains at the logic high level for only a time period that is shorter than the predetermined time duration for the timer 1020 before changing from the logic high level back to the logic low level, the output signal 1082 (e.g., ac_low) is at the logic low level.

According to some embodiments, the output signal 1082 (e.g., ac_low) is used as the output signal 482 (e.g., ac_low) and received by the microcontroller unit (MCU) 420. For example, when the switch 1070 is closed by the input signal 488 (e.g., ac_low_ctrl), if the output signal 1082 (e.g., ac_low) is at the logic low level, the microcontroller unit (MCU) 420 determines that the AC voltage 330 is in the high-voltage state. As an example, when the switch 1070 is closed by the input signal 488 (e.g., ac_low_ctrl), if the output signal 1082 (e.g., ac_low) is at the logic high level, the microcontroller unit (MCU) 420 determines that the AC voltage 330 is determined in the low-voltage state.

In some examples, when the switch 1070 is closed by the input signal 488 (e.g., ac_low_ctrl), if the voltage 388 (e.g., $V_{ACD}$) remains lower than the threshold voltage 1011 (e.g., $V_{R1}$) during the predetermined time duration for the timer 1020, the output signal 1082 (e.g., ac_low) is at the logic high level, indicating that the AC voltage 330 is in the low-voltage state. In certain examples, when the switch 1070 is closed by the input signal 488 (e.g., ac_low_ctrl), if the voltage 388 (e.g., $V_{ACD}$) becomes higher than the threshold voltage 1011 (e.g., $V_{R1}$) at any time during the predetermined time duration for the timer 1020, the output signal 1082 (e.g., ac_low) is at the logic low level, indicating that the AC voltage 330 is in the high-voltage state.

In certain embodiments, if the switch 1070 is open, the clamping circuit 1040 sets the peak magnitude of the voltage 388 (e.g., $V_{ACD}$) to a predetermined value. For example, when the switch 1070 is open, if the voltage 388 (e.g., $V_{ACD}$) attempts to become larger than the predetermined value (e.g., 5 volts), the clamping circuit 1040 sets the voltage 388 (e.g., $V_{ACD}$) to the predetermined value (e.g., 5 volts). As an example, the clamping circuit 1040 is a Zener diode that includes a cathode and an anode, where the cathode is connected to the terminal 2520, the inverting input terminal 1014 and the non-inverting input terminal 1052, and the anode is biased to the ground voltage on the secondary side of the flyback switching power supply system 300. In some examples, the comparator 1050 includes a non-inverting input terminal 1052 (e.g., a "+" terminal), an inverting input terminal 1054 (e.g., a "−" terminal), and an output terminal 1056. For example, the non-inverting input terminal 1052 (e.g., a "+" terminal) receives the voltage 388 (e.g., $V_{ACD}$). As an example, the inverting input terminal 1054 (e.g., a "−" terminal) receives a threshold voltage 1051 (e.g., $V_{R2}$). In certain examples, the comparator 1050 compares the voltage 388 (e.g., $V_{ACD}$) and the threshold voltage 1051 (e.g., $V_{R2}$) and outputs a comparison signal 1055 at the output terminal 1056.

In some embodiments, the comparison signal 1055 is received by an input terminal 2092 of the debouncing circuit 2090, and the debouncing circuit 2090 generates a signal 2096 (e.g., Vd_low_det) at an output terminal 2094 of the debouncing circuit 2090. In certain examples, the debouncing circuit 2090 uses a debouncing time constant (e.g., $T_d$) to perform a debouncing process on the comparison signal 1055. For example, the debouncing time constant (e.g., 1 μS) is longer than a cycle period of certain oscillation rings in the comparison signal 1055 so that these oscillation rings are removed after the debouncing process is performed. As an example, the removal of these oscillation rings improves accuracy of the determination whether or not the flyback switching power supply system 300 is unplugged from the voltage supply (e.g., an AC power supply) that provides the AC voltage 330.

In some embodiments, the signal 2096 (e.g., Vd_low_det) is received by an input terminal 1062 of the timer 1060, and in response the timer 1060 generates an output signal 1084 (e.g., ac_off) at an output terminal 1064 of the timer 1060. For example, if the signal 2096 (e.g., Vd_low_det) is at a logic low level, the output signal 1084 (e.g., ac_off) is also at the logic low level. As an example, if the signal 2096 (e.g., Vd_low_det) changes from the logic low level to a logic high level and then remains at the logic high level for at least a predetermined time duration for the timer 1060, the output signal 1084 (e.g., ac_off) changes from the logic low level to the logic high level. For example, if the signal 2096 (e.g., Vd_low_det) changes from the logic low level to the logic high level but remains at the logic high level for only a time period that is shorter than the predetermined time duration for the timer 1060 before changing from the logic high level back to the logic low level, the output signal 1084 (e.g., ac_off) is at the logic low level.

According to certain embodiments, the output signal 1084 (e.g., ac_off) is used as the output signal 484 (e.g., ac_off) and received by the microcontroller unit (MCU) 420. For example, when the switch 1070 is open by the input signal 488 (e.g., ac_low_ctrl), if the output signal 1084 (e.g., ac_off) is at the logic low level, the microcontroller unit (MCU) 420 determines that the flyback switching power supply system 300 is not unplugged from the voltage supply (e.g., an AC power supply) that provides the AC voltage 330. As an example, when the switch 1070 is open by the input signal 488 (e.g., ac_low_ctrl), if the output signal 1084 (e.g., ac_off) is at the logic high level, the microcontroller unit (MCU) 420 determines that the flyback switching power supply system 300 is unplugged from the voltage supply (e.g., an AC power supply) that provides the AC voltage 330. In some examples, when the switch 1070 is open by the input signal 488 (e.g., ac_low_ctrl), if the threshold voltage 1051 (e.g., $V_{R2}$) remains lower than the voltage 388 (e.g., $V_{ACD}$) during the predetermined time duration for the timer 1060, the output signal 1084 (e.g., ac_off) is at the logic high level, indicating that the flyback switching power supply system 300 is unplugged. In certain examples, when the switch 1070 is open by the input signal 488 (e.g., ac_low_ctrl), if the threshold voltage 1051 (e.g., $V_{R2}$) becomes higher than the voltage 388 (e.g., $V_{ACD}$) at any time during the predetermined time duration for the timer 1060, the output signal 1084 (e.g., ac_off) is at the logic low level, indicating that the flyback switching power supply system 300 is not unplugged.

As shown in FIG. 4, the output current amplifier 434 (e.g., AVCCR) includes the non-inverting input terminal (e.g., a "+" terminal) coupled to the terminal 2564 (e.g., an ISP pin) and also includes an inverting input terminal (e.g., a "−" terminal) coupled to the terminal 2570 (e.g., an ISN pin) according to certain embodiments. For example, as shown in FIG. 3, the terminal 2564 (e.g., an ISP pin) is connected to one terminal of the resistor 394 (e.g., $R_{sense}$), and the terminal 2570 (e.g., an ISN pin) is connected to another terminal of the resistor 394 (e.g., $R_{sense}$). As an example, the output current amplifier 434 (e.g., AVCCR) generates the input signal 490 (e.g., vcs_det) based at least in part on the resistance of the resistor 394 (e.g., $R_{sense}$), and the input signal 490 (e.g., vcs_det) is received by the detection circuit 1000 used as the detection circuit 418.

As shown in FIG. 10, the comparator 1072 includes a non-inverting input terminal 1074 (e.g., a "+" terminal) and an inverting input terminal 1076 (e.g., a "−" terminal) according to some embodiments. In certain examples, the non-inverting input terminal 1074 (e.g., a "+" terminal) receives a threshold voltage 1073 (e.g., $V_{R3}$), and the inverting input terminal 1076 (e.g., a "−" terminal) receives the input signal 490 (e.g., vcs_det). In some examples, the comparator 1072 compares the threshold voltage 1073 (e.g., $V_{R3}$) and the input signal 490 (e.g., vcs_det) and outputs a comparison signal 1077 at the output terminal 1078. For example, if the input signal 490 (e.g., vcs_det) is lower than the threshold voltage 1073 (e.g., $V_{R3}$), the comparison signal 1077 is at a logic high level. As an example, if the input signal 490 (e.g., vcs_det) is higher than the threshold voltage 1073 (e.g., $V_{R3}$), the comparison signal 1077 is at a logic low level.

In certain embodiments, the signal 2096 (e.g., Vd_low_det) is received by the timer 1060 and the short-circuit detector 1090. For example, the short-circuit detector 1090 also receives the comparison signal 1077. As an example, when the switch 1070 is open by the input signal 488 (e.g., ac_low_ctrl), the short-circuit detector 1090 generate the output signal 1086 (e.g., $R_{sense}$_short), which indicates whether or not the resistor 394 (e.g., $R_{sense}$) is short circuited. In some examples, the output signal 1086 (e.g., Rsense_short) is used as the output signal 486 (e.g., $R_{sense\_}$short) and received by the microcontroller unit (MCU) 420. For example, when the switch 1070 is open by the input signal 488 (e.g., ac_low_ctrl), if the output signal 1086 (e.g., Rsense_short) is at a logic high level, the microcontroller unit (MCU) 420 determines that the resistor 394 (e.g., $R_{sense}$) is short circuited. As an example, when the switch 1070 is open by the input signal 488 (e.g., ac_low_ctrl), if the output signal 1086 (e.g., Rsense_short) is at a logic low level, the microcontroller unit (MCU) 420 determines that the resistor 394 (e.g., $R_{sense}$) is not short circuited.

In some embodiments, when the switch 1070 is open by the input signal 488 (e.g., ac_low_ctrl), the short-circuit detector 1090 uses the signal 2096 (e.g., Vd_low_det) to determine the cycle frequency of the drive signal 382 (e.g., a PWM signal) and then uses the determined cycle frequency and the comparison signal 1077 to generate the output signal 1086 (e.g., Rsense_short), which indicates whether or not the resistor 394 (e.g., $R_{sense}$) is short circuited. In certain examples, when the switch 1070 is open by the input signal 488 (e.g., ac_low_ctrl), the short-circuit detector 1090 determines the cycle frequency of the drive signal 382 (e.g., a PWM signal) based at least in part on the signal 2096 (e.g., Vd_low_det) and also determines whether the cycle frequency of the drive signal 382 (e.g., a PWM signal) exceeds a predetermined frequency threshold (e.g., 40 KHz). For example, when the switch 1070 is open by the input signal 488 (e.g., ac_low_ctrl), if the cycle frequency of the drive signal 382 (e.g., a PWM signal) is higher than the predetermined frequency threshold (e.g., 40 KHz) and the input signal 490 (e.g., vcs_det) is lower than the threshold voltage 1073 (e.g., $V_{R3}$), the short-circuit detector 1090 generate the output signal 1086 (e.g., $R_{sense}$_short) to indicate that the resistor 394 (e.g., $R_{sense}$) is short circuited. As an example, when the switch 1070 is open by the input signal 488 (e.g., ac_low_ctrl), if the cycle frequency of the drive signal 382 (e.g., a PWM signal) is lower than the predetermined frequency threshold (e.g., 40 KHz) and/or the input signal 490 (e.g., vcs_det) is higher than the threshold voltage 1073 (e.g., $V_{R3}$), the short-circuit detector 1090 generate the output signal 1086 (e.g., $R_{sense}$_short) to indicate that the resistor 394 (e.g., $R_{sense}$) is not short circuited.

As shown in FIG. 10, the detection circuit 1000 is used as the detection circuit 418 to determine whether the AC voltage 330 is in the high-voltage state or in the low-voltage state based at least in part on the comparison signal 1015 during the predetermined time duration for the timer 1020 when the switch 1070 is closed by the input signal 488 (e.g., ac_low_ctrl), the detection circuit 1000 is used as the detection circuit 418 to determine whether or not the flyback switching power supply system 300 is unplugged from the voltage supply (e.g., an AC power supply) that provides the AC voltage 330, based at least in part on the output signal 1086 (e.g., $R_{sense}$_short) during the predetermined time duration for the timer 1060 when the switch 1070 is open by the input signal 488 (e.g., ac_low_ctrl), and the detection circuit 1000 is used as the detection circuit 418 to determine whether or not the resistor 394 (e.g., $R_{sense}$) is short circuited based at least in part on the output signal 1086 (e.g., Rsense_short) and the comparison signal 1077 when the switch 1070 is open by the input signal 488 (e.g., ac_low_ctrl) according to certain embodiments.

In some examples, when the switch 1070 is closed (e.g., when the input signal 488 is at the logic high level), the output signal 1082 (e.g., ac_low) is used to determine whether or not the AC voltage 330 is in the high-voltage state or in the low-voltage state. For example, when the input signal 488 (e.g., ac_low_ctrl) is at the logic high level, if the output signal 1082 (e.g., ac_low) is at the logic low level, the AC voltage 330 is determined to be in the high-voltage state. As an example, when the input signal 488 (e.g., ac_low_ctrl) is at the logic high level, if the output signal 1082 (e.g., ac_low) is at the logic high level, the AC voltage 330 is determined to be in the low-voltage state. In certain examples, when the switch 1070 is open (e.g., when the input signal 488 is at the logic low level), the output signal 1084 (e.g., ac_off) is used to determine whether or not the flyback switching power supply system 300 is unplugged from the voltage supply (e.g., an AC power supply) that provides the AC voltage 330. For example, when the input signal 488 (e.g., ac_low_ctrl) is at the logic low level, if the output signal 1084 (e.g., ac_off) is at the logic low level, the flyback switching power supply system 300 is determined to be not unplugged from the voltage supply (e.g., an AC power supply) that provides the AC voltage 330. As an example, when the input signal 488 (e.g., ac_low_ctrl) is at the logic low level, if the output signal 1084 (e.g., ac_off) is at the logic high level, the flyback switching power supply system 300 is determined to be unplugged from the voltage supply (e.g., an AC power supply) that provides the AC voltage 330. In some examples, when the switch 1070 is open (e.g., when the input signal 488 is at the logic low level), the output signal 1086 (e.g., Rsense_short) is used to determine whether or not the resistor 394 (e.g., $R_{sense}$) is short circuited. For example, when the input signal 488 (e.g., ac_low_ctrl) is at the logic low level, if the output signal 1086 (e.g., Rsense_short) is at the logic high level, the resistor 394 (e.g., $R_{sense}$) is determined to be short circuited. As an example, when the input signal 488 (e.g., ac_low_ctrl) is at the logic low level, if the output signal 1086 (e.g., Rsense_short) is at the logic low level, the resistor 394 (e.g., $R_{sense}$) is determined to be not short circuited.

As shown in FIG. 3, the detection circuit 1000 is used as the detection circuit 418 to send the output signal 1082 (e.g., ac_low) as the output signal 482 (e.g., ac_low), the output signal 1084 (e.g., ac_off) as the output signal 484 (e.g., ac_off), and the output signal 1086 (e.g., Rsense_short) as the output signal 486 (e.g., Rsense_short), to the microcontroller unit (MCU) 420 according to some embodiments. In certain examples, if the output signal 1086 (e.g., Rsense_short) indicates that the resistor 394 (e.g., $R_{sense}$) is short circuited, the transistor 340 (e.g., a transistor M4) is turned off by the drive signal generated by the gate driver 422 and received through the terminal 2560 (e.g., a GATE pin). As an example, if the output signal 1086 (e.g., Rsense_short) indicates that the resistor 394 (e.g., $R_{sense}$) is short circuited, the flyback switching power supply system 300 (e.g., a power converter) reduces the output current 398 (e.g., $I_o$) to the load 390 (e.g., a Type-C device) to zero by turning off the transistor 340 (e.g., a transistor M4).

Figure 11:
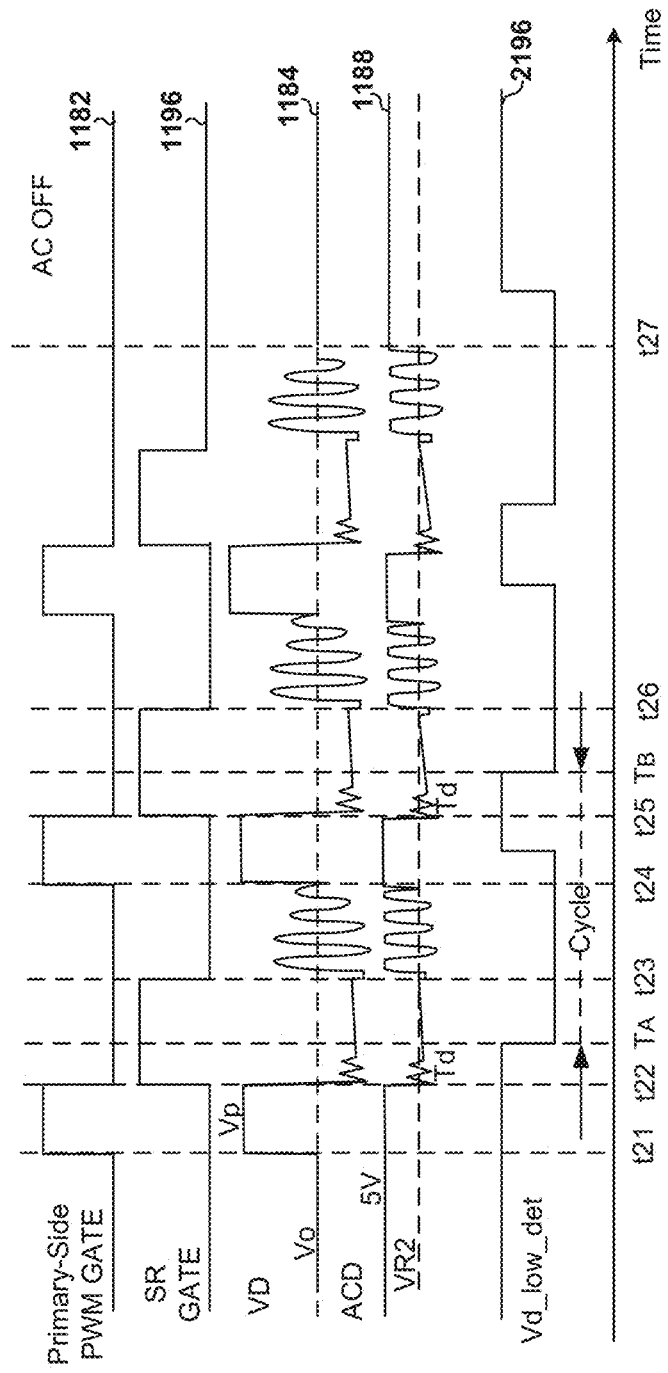
FIG. 11 shows a simplified timing diagram for the flyback switching power supply system as shown in FIG. 3 that includes the detection circuit as shown in FIG. 10 according to certain embodiments of the present invention.

FIG. 11 shows a simplified timing diagram for the flyback switching power supply system 300 as shown in FIG. 3 that includes the detection circuit 1000 as shown in FIG. 10 according to certain embodiments of the present invention. This diagram is merely an example, which should not unduly limit the scope of the claims. One of ordinary skill in the art would recognize many variations, alternatives, and modifications. The waveform 1182 represents the drive signal 382 as a function of time, the waveform 1196 represents the drive signal 396 as a function of time, the waveform 1184 represents the voltage 384 (e.g., $V_D$) as a function of time, the waveform 1188 represents the voltage 388 (e.g., $V_{ACD}$) as a function of time, and the waveform 2196 represents the signal 2096 (e.g., Vd_low_det) as a function of time. For example, the drive signal 382 is received by the gate terminal of the primary-side power switch 312 (e.g., a transistor M2), the drive signal 396 is received by the gate terminal of the transistor 326 (e.g., a transistor M3), the voltage 384 (e.g., $V_D$) is received by the terminal 2420 (e.g. a $V_D$ pin) of the synchronous rectification (SR) controller 2400 (e.g., a chip) from the secondary winding 306, and the signal 2096 (e.g., Vd_low_det) is generated by the debouncing circuit 2090. As an example, the terminal 2520 (e.g., an ACD pin) is biased at the voltage 388 (e.g., $V_{ACD}$).

As shown by the waveform 1182, at time $t_{21}$, the drive signal 382 (e.g., a PWM signal) changes from a logic low level to a logic high level and the primary-side power switch 312 changes from being open to being closed (e.g., the transistor M2 changing from being turned off to being turned on) according to some embodiments. As an example, from time $t_{21}$ to time $t_{22}$, the drive signal 382 (e.g., a PWM signal) remains at the logic high level and the primary-side power switch 312 remains closed (e.g., the transistor M2 being turned on). In certain examples, at time $t_{22}$, the drive signal 382 (e.g., a PWM signal) changes from the logic high level to the logic low level and the primary-side power switch 312 changes from being closed to being open (e.g., the transistor M2 changing from being turned on to being turned off). As an example, from time $t_{22}$ to time $t_{24}$, the drive signal 382 (e.g., a PWM signal) remains at the logic low level and the primary-side power switch 312 remains open (e.g., the transistor M2 being turned off). For example, when the drive signal 382 (e.g., a PWM signal) remains at the logic low level and the primary-side power switch 312 remains open (e.g., the transistor M2 being turned off) from time $t_{22}$ to time $t_{24}$, the secondary winding 306 undergoes a demagnetization process from time $t_{22}$ to time $t_{23}$ and undergoes a resonance process from time $t_{23}$ to time $t_{24}$.

In some examples, as shown by the waveform 1182, at time $t_{24}$, the drive signal 382 (e.g., a PWM signal) changes from the logic low level to the logic high level and the primary-side power switch 312 changes from being open to being closed (e.g., the transistor M2 changing from being turned off to being turned on). As an example, from time $t_{24}$ to time $t_{25}$, the drive signal 382 (e.g., a PWM signal) remains at the logic high level and the primary-side power switch 312 remains closed (e.g., the transistor M2 being turned on). In certain examples, at time $t_{25}$, the drive signal 382 (e.g., a PWM signal) changes from the logic high level to the logic low level as shown by the waveform 1182, and the drive signal 396 changes from the logic low level to the logic high level as shown by the waveform 1196. For example, from time $t_{25}$ to time $t_{26}$, the drive signal 396 remains at the logic high level as shown by the waveform 1196. As an example, at time $t_{26}$, the drive signal 396 changes from the logic high level to the logic low level as shown by the waveform 1196.

According to certain embodiments, from time $t_{21}$ to time $t_{22}$, the voltage 384 is determined as follows:

$$V_P = \frac{N_s}{N_p} \times \sqrt{2} \times V_{ac} + V_O \quad \text{(Equation 13)}$$

where $V_P$ represents the magnitude of the voltage 384 (e.g., $V_D$) from time $t_{21}$ to time $t_{22}$, $V_{ac}$ represents the effective value (e.g., the root mean square) of the AC voltage 330, and $V_o$ represents the output voltage 392. Additionally, $N_p$ represents the number of turns of the primary winding 304, and $N_s$ represents the number of turns of the secondary winding 306. For example, as shown by Equation 13, when the primary-side power switch 312 is closed (e.g., the transistor M2 is turned on), the magnitude of the voltage 384 (e.g., $V_D$) depends on the effective value (e.g., the RMS) of the AC voltage 330. As an example, from time $t_{21}$ to time $t_{22}$, the magnitude of the voltage 384 (e.g., $V_D$) is used to detect the effective value (e.g., the RMS) of the AC voltage 330.

In some embodiments, as shown by Equations 4 and 13, from time $t_{21}$ to time $t_{22}$, the voltage 388 (e.g., $V_{ACD}$) is determined as follows:

$$V_{ACD} = \frac{R_2}{R_1 + R_2} \times \left( \frac{N_s}{N_p} \times \sqrt{2} \times V_{ac} + V_O \right) \quad \text{(Equation 14)}$$

where $V_{ACD}$ represents the voltage 388, $V_{ac}$ represents the effective value (e.g., the root mean square) of the AC voltage 330, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 1030.

In certain embodiments, as shown by Equation 14, from time $t_{21}$ to time $t_{22}$, the effective value (e.g., the root mean square) of the AC voltage 330 is determined as follows:

$$V_{ac} = \frac{\sqrt{2}}{2} \times \frac{N_p}{N_s} \times \left( V_{ACD} \times \frac{R_1 + R_2}{R_2} - V_O \right) \quad \text{(Equation 15)}$$

where $V_{ac}$ represents the effective value (e.g., the root mean square) of the AC voltage 330, $V_{ACD}$ represents the voltage 388, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 1030.

As shown in FIG. 10, the comparator 1010 uses the threshold voltage 1011 (e.g., $V_{R1}$) to compare with the voltage 388 (e.g., $V_{ACD}$) in order to determine the comparison signal 1015 according to some embodiments. According to certain embodiments, as shown by Equation 15, effectively, the comparator 1010 uses a threshold voltage $V_{ac}$ jet as shown in Equation 16 to compare with the effective value (e.g., the root mean square) of the AC voltage 330 in order to determine the comparison signal 1015.

$$V_{ac\_det} = \frac{\sqrt{2}}{2} \times \frac{N_p}{N_s} \times \left( V_{R1} \times \frac{R_1 + R_2}{R_2} - V_O \right) \quad \text{(Equation 16)}$$

where $V_{R1}$ represents the threshold voltage 1011, and $V_o$ represents the output voltage 392. Additionally, $N_p$ represents the number of turns of the primary winding 304, and $N_s$ represents the number of turns of the secondary winding 306. Also, $R_1$ represents the resistor 328, and $R_2$ represents the resistor 1030.

In some examples, if the effective value (e.g., the root mean square) of the AC voltage 330 remains lower than the threshold voltage $V_{ac\_det}$ during the predetermined time duration for the timer 1020, the output signal 1082 is at the logic high level, indicating that the AC voltage 330 is in the low-voltage state. In certain examples, if the effective value (e.g., the root mean square) of the AC voltage 330 becomes higher than the threshold voltage $V_{ac\_det}$ at any time during the predetermined time duration for the timer 1020, the output signal 1082 is at the logic low level, indicating that the AC voltage 330 is in the high-voltage state.

According to certain embodiments, at time $t_{22}$, the drive signal 396 changes from the logic low level to the logic high level as shown by the waveform 1196, and the voltage 388 (e.g., $V_{ACD}$) becomes smaller than $V_{R2}$ (e.g., the threshold voltage 1051) as shown by the waveform 1188. For example, $V_{R2}$ (e.g., the threshold voltage 1051) is equal to 0.1 volts. In some examples, from time $t_{22}$ to time $t_{23}$, the drive signal 396 remains at the logic high level as shown by the waveform 1196, and the time duration from time $t_{22}$ to time $t_{23}$ is longer than $T_d$ (e.g., the debouncing time constant of the debouncing circuit 2090). In certain examples, at time TA, which follows time $t_{22}$ by $T_d$ (e.g., the debouncing time constant of the debouncing circuit 2090), the signal 2096 (e.g., Vd_low_det) changes from the logic high level to the logic low level as shown by the waveform 2196.

According to some embodiments, at time $t_{25}$, the drive signal 396 changes from the logic low level to the logic high level as shown by the waveform 1196, and the voltage 388 (e.g., $V_{ACD}$) becomes smaller than $V_{R2}$ (e.g., the threshold voltage 1051) as shown by the waveform 1188. In some examples, from time $t_{25}$ to time $t_{26}$, the drive signal 396 remains at the logic high level as shown by the waveform 1196, and the time duration from time $t_{25}$ to time $t_{26}$ is longer than $T_d$ (e.g., the debouncing time constant of the debouncing circuit 2090). In certain examples, at time TB, which follows time $t_{25}$ by $T_d$ (e.g., the debouncing time constant of the debouncing circuit 2090), the signal 2096 (e.g., Vd_low_det) changes from the logic high level to the logic low level as shown by the waveform 2196.

As shown in FIG. 10, the short-circuit detector 1090 uses the signal 2096 (e.g., Vd_low_det) to determine the cycle frequency of the drive signal 382 (e.g., a PWM signal) according to certain embodiments. In some examples, the short-circuit detector 1090 detects the signal 2096 (e.g., Vd_low_det) changes from the logic high level to the logic low level as shown by the waveform 2196 at time TA and at time TB, and uses the time interval from time TA to time TB to determine the cycle period of the drive signal 382 (e.g., a PWM signal). For example, the cycle period of the drive signal 382 (e.g., a PWM signal) is equal to the time interval from time TA to time TB. As an example, the short-circuit detector 1090 determines the cycle frequency of the drive signal 382 (e.g., a PWM signal) based at least in part on the cycle period of the drive signal 382 (e.g., a PWM signal).

In certain examples, when the switch 1070 is open by the input signal 488 (e.g., ac_low_ctrl), if the cycle frequency of the drive signal 382 (e.g., a PWM signal) is higher than the predetermined frequency threshold (e.g., 40 KHz) and the input signal 490 (e.g., vcs_det) is lower than the threshold voltage 1073 (e.g., $V_{R3}$), the short-circuit detector 1090 generate the output signal 1086 (e.g., Rsense_short) to indicate that the resistor 394 (e.g., $R_{sense}$) is short circuited. For example, if the output signal 1086 (e.g., Rsense_short) indicates that the resistor 394 (e.g., $R_{sense}$) is short circuited, the transistor 340 (e.g., a transistor M4) is turned off by the drive signal generated by the gate driver 422 and received through the terminal 2560 (e.g., a GATE pin). As an example, the transistor 340 (e.g., a transistor M4) is turned off in order to reduce the output current 398 (e.g., $I_o$) to zero. For example, the transistor 340 (e.g., a transistor M4) is turned off in order to prevent the output current 398 (e.g., $I_o$) from running out of control and prevent one or more components of the flyback switching power supply system 300 and/or the load 390 (e.g., a Type-C device) from being damaged. As shown in FIG. 11, after $t_{27}$, the flyback switching power supply system 300 (e.g., a power converter) is unplugged from the voltage supply (e.g., an AC power supply) that provides the AC voltage 330 according to some embodiments.

Figure 12:
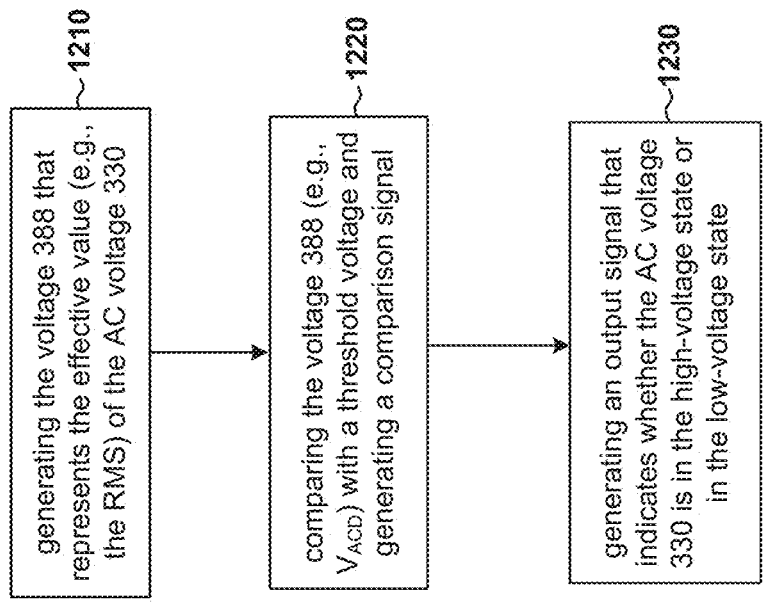
FIG. 12 is a simplified diagram showing a method for determining whether the AC voltage as shown in FIG. 3 is in a high-voltage state or in a low-voltage state according to some embodiments of the present invention.

FIG. 12 is a simplified diagram showing a method for determining whether the AC voltage 330 as shown in FIG. 3 is in a high-voltage state or in a low-voltage state according to some embodiments of the present invention. The method 1200 includes a process 1210 for generating the voltage 388 that represents the effective value (e.g., the RMS) of the AC voltage 330, a process 1220 for comparing the voltage 388 (e.g., $V_{ACD}$) with a threshold voltage and generating a comparison signal, and a process 1230 for generating an output signal that indicates whether the AC voltage 330 is in the high-voltage state or in the low-voltage state. For example, the method 1200 is implemented according to FIG. 3, FIG. 4, FIG. 5, FIG. 7, FIG. 8, FIG. 9, and/or FIG. 10. Although the above has been shown using a selected group of processes for the method 1200, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 1210, the voltage 388 (e.g., $V_{ACD}$) is generated to represent the effective value (e.g., the RMS) of the AC voltage 330 according to certain embodiments. For example, the resistor 328 (e.g., $R_1$) and the resistor 530 (e.g., $R_2$) are parts of a voltage divider that generates the voltage 388 (e.g., $V_{ACD}$) as shown in FIG. 5. As an example, the resistor 328 (e.g., $R_1$) and the resistor 730 (e.g., $R_2$) are parts of a voltage divider that generates the voltage 388 (e.g., $V_{ACD}$) as shown in FIG. 7. For example, the resistor 328 (e.g., $R_1$) and the resistor 830 (e.g., $R_2$) are parts of a voltage divider that generates the voltage 388 (e.g., $V_{ACD}$) as shown in FIG. 8. As an example, the resistor 328 (e.g., $R_1$) and the resistor 930 (e.g., $R_2$) are parts of a voltage divider that generates the voltage 388 (e.g., $V_{ACD}$) as shown in FIG. 9. For example, the resistor 328 (e.g., $R_1$) and the resistor 1030 (e.g., $R_2$) are parts of a voltage divider that generates the voltage 388 (e.g., $V_{ACD}$) as shown in FIG. 10.

At the process 1220, the voltage 388 (e.g., $V_{ACD}$) is compared with a threshold voltage, and the comparison signal is generated based at least in part on the voltage 388 (e.g., $V_{ACD}$) and the threshold voltage according to some embodiments. In certain examples, if the voltage 388 (e.g., $V_{ACD}$) is lower than the threshold voltage, the comparison signal is generated at a logic high level. In some examples, if the voltage 388 (e.g., $V_{ACD}$) is higher than the threshold voltage, the comparison signal is generated at a logic low level. For example, the threshold voltage is the threshold voltage 511 (e.g., $V_{R1}$), and the comparison signal is the comparison signal 515 as shown in FIG. 5. As an example, the threshold voltage is the threshold voltage 711 (e.g., $V_{R1}$), and the comparison signal is the comparison signal 715 as shown in FIG. 7. For example, the threshold voltage is the threshold voltage 811 (e.g., $V_{R1}$), and the comparison signal is the comparison signal 815 as shown in FIG. 8. As an example, the threshold voltage is the threshold voltage 911 (e.g., $V_{R1}$), and the comparison signal is the comparison signal 915 as shown in FIG. 9. For example, the threshold voltage is the threshold voltage 1011 (e.g., $V_{R1}$), and the comparison signal is the comparison signal 1015 as shown in FIG. 10.

At the process 1230, based at least in part on the comparison signal, the output signal is generated to indicate whether the AC voltage 330 is in the high-voltage state or in the low-voltage state according to certain embodiments. In some examples, the comparison signal is received by a timer, which in response generates the output signal (e.g., ac_low) that indicates whether the AC voltage 330 is in the high-voltage state or in the low-voltage state. For example, if the comparison signal is at the logic low level, the output signal (e.g., ac_low) is also at the logic low level. As an example, if the comparison signal changes from the logic low level to the logic high level and then remains at the logic high level for at least a predetermined time duration, the output signal (e.g., ac_low) changes from the logic low level to the logic high level. For example, if the comparison signal changes from the logic low level to the logic high level at any time during the predetermined time duration, the output signal (e.g., ac_low) is at the logic low level. In certain examples, if the output signal (e.g., ac_low) is at the logic low level, the AC voltage 330 is determined to be in the high-voltage state, and if the output signal (e.g., ac_low) is at the logic high level, the AC voltage 330 is determined to be in the low-voltage state.

For example, the comparison signal is the comparison signal 515, the timer is the timer 520, and the output signal (e.g., ac_low) is the output signal 582 as shown in FIG. 5. As an example, the comparison signal is the comparison signal 715, the timer is the timer 720, and the output signal (e.g., ac_low) is the output signal 782 as shown in FIG. 7. For example, the comparison signal is the comparison signal 815, the timer is the timer 820, and the output signal (e.g., ac_low) is the output signal 882 as shown in FIG. 8. As an example, the comparison signal is the comparison signal 915, the timer is the timer 920, and the output signal (e.g., ac_low) is the output signal 982 as shown in FIG. 9. For example, the comparison signal is the comparison signal 1015, the timer is the timer 1020, and the output signal (e.g., ac_low) is the output signal 1082 as shown in FIG. 10.

Certain embodiments of the present invention provide a detection circuit and method for a fast charging system, where the detection circuit determines whether the line voltage (e.g., the AC voltage) is in a high-voltage state or in a low-voltage state by using a timer to process an output signal of a comparator. In some examples, the fast charging system uses the detection circuit and method to perform real-time detection related to the line voltage (e.g., the AC voltage) that is received by the fast charging system on the primary side. In certain examples, based at least in part on the detected state of the line voltage (e.g., the AC voltage), the fast charging system outputs appropriate output power to the load (e.g., a Type-C device). For example, if the line voltage (e.g., the AC voltage) is determined to be in the high-voltage state, the output power of the fast charging system is increased to raise the charging speed. As an example, if the line voltage (e.g., the AC voltage) is determined to be in the low-voltage state, the output power of the fast charging system is decreased in order to avoid insufficient input power received on the primary side of the fast charging system.

According to some embodiments, a controller for charging one or more loads includes: a controller terminal configured to be biased at a first voltage related to a second voltage of a secondary winding of a power converter, the power converter further including a primary winding coupled to the secondary winding, the power converter being configured to, if the power converter is not unplugged from a voltage supply for an AC input voltage, receive the AC input voltage represented by the second voltage and output an output power to the one or more loads; and a voltage detector configured to: process information associated with the first voltage; and determine whether the AC input voltage is in a first voltage state or in a second voltage state based at least in part on the first voltage; wherein the controller is configured to: if the AC input voltage is determined to be in the first voltage state, cause the power converter to set the output power at a first power level; if the AC input voltage is determined in the second voltage state, cause the power converter to set the output power at a second power level; wherein: the first voltage state and the second voltage state are different; and the first power level and the second power level are different. For example, the controller is implemented according to at least FIG. 3, FIG. 4, FIG. 5, FIG. 7, FIG. 8, FIG. 9, and/or FIG. 10.

In some examples, the first voltage state is a high-voltage state; the second voltage state is a low-voltage state; and the first power level is higher than the second power level. In certain examples, the one or more loads include a device including one or more batteries to be charged by the power converter. In some examples, the first voltage is directly proportional to the second voltage, the second voltage representing the AC input voltage received by the power converter. In certain examples, the voltage detector includes: a first resistor including a first resistor terminal and a second resistor terminal; wherein: the first resistor terminal is biased to a predetermined voltage; and the second resistor terminal is coupled, through the controller terminal, to a third resistor terminal of a second resistor, the second resistor further including a fourth resistor terminal configured to receive the second voltage from the secondary winding; wherein the second resistor terminal is biased at the first voltage. In some examples, the predetermined voltage is a ground voltage.

In certain examples, the voltage detector further includes: a comparator including a first comparator terminal, a second comparator terminal, and a third comparator terminal; wherein: the first comparator terminal configured to receive a threshold voltage; and the second comparator terminal configured to receive the first voltage; wherein the comparator is configured to: generate a comparison signal based at least in part on the threshold voltage and the first voltage; and output the comparison signal at the third comparator terminal.

In some examples, the voltage detector further includes: a timer configured to: receive the comparison signal; determine whether the AC input voltage is in the first voltage state or in the second voltage state based at least in part on the comparison signal and a predetermined time duration; and generate a control signal indicating whether the AC input voltage is determined to be in the first voltage state or in the second voltage state. In certain examples, the controller further includes a microcontroller unit configured to receive the control signal from the voltage detector. In some examples, the microcontroller unit is further configured to: if the control signal indicates that the AC input voltage is determined to be in the first voltage state, cause the power converter to set the output power at the first power level; and if the control signal indicates that the AC input voltage is determined to be in the second voltage state, cause the power converter to set the output power at the second power level.

In certain examples, the comparator is further configured to: if the threshold voltage is higher than the first voltage, generate the comparison signal at a first logic level; and if the threshold voltage is lower than the first voltage, generate the comparison signal at a second logic level; wherein the first logic level and the second logic level are different. In some examples, the timer is further configured to: if, after changing from the second logic level to the first logic level, the comparison signal remains at the first logic level for at least a predetermined time duration, generate the control signal at the first logic level to indicate that the AC input voltage is in the second voltage state. In certain examples, the timer is further configured to: if the comparison signal is at the second logic level, generate the control signal at the second logic level to indicate that the AC input voltage is in the first voltage state; and if, after changing from the second logic level to the first logic level, the comparison signal remains at the first logic level for only a time period that is shorter than the predetermined time duration before changing from the first logic level back to the second logic level, generate the control signal at the second logic level to indicate that the AC input voltage is in the first voltage state.

In some examples, the voltage detector includes: a first resistor including a first resistor terminal and a second resistor terminal; a switch including a first switch terminal and a second switch terminal; wherein: the first switch terminal is biased to a predetermined voltage; the first resistor terminal is coupled to the second switch terminal; and the second resistor terminal is coupled, through the controller terminal, to a third resistor terminal of a second resistor, the second resistor further including a fourth resistor terminal configured to receive the second voltage from the secondary winding. In certain examples, the predetermined voltage is a ground voltage. In some examples, the switch is configured to receive a first control signal; wherein: if the first control signal is at a first logic level, the switch is closed; and if the second control signal is at a second logic level, the switch is open.

In certain examples, the voltage detector further includes: a first comparator configured to: receive a first threshold voltage and the first voltage; and generate a first comparison signal based at least in part on the first threshold voltage and the first voltage. In some examples, the voltage detector further includes: a first timer configured to, if the switch is closed by the first control signal: receive the first comparison signal; determine whether the AC input voltage is in the first voltage state or in the second voltage state based at least in part on the first comparison signal and a first predetermined time duration; and generate a second control signal indicating whether the AC input voltage is determined to be in the first voltage state or in the second voltage state. In certain examples, the controller further includes a microcontroller unit configured to send the first control signal to the switch and receive the second control signal from the first timer.

In some examples, the microcontroller unit is further configured to, if the first control signal is at the first logic level: cause the power converter to set the output power at the first power level if the second control signal indicates that the AC input voltage is determined to be in the first voltage state; and cause the power converter to set the output power at the second power level if the second control signal indicates that the AC input voltage is determined in the second voltage state. In certain examples, the voltage detector further includes: a damper including a first damper terminal and a second damper terminal; wherein: the first damper terminal is biased to the predetermined voltage; and the second damper terminal is coupled to the controller terminal and the second resistor terminal; wherein the damper is configured to set a peak magnitude of the first voltage to a predetermined value. In some examples, the voltage detector further includes: a second comparator configured to: receive the first voltage and a second threshold voltage; and generate a second comparison signal based at least in part on the first voltage and the second threshold voltage.

In certain examples, the voltage detector further includes: a second timer configured to, if the switch is open by the first control signal: process information associated with the second comparison signal; determine whether the power converter is unplugged from the voltage supply for the AC input voltage based on at least information associated with the second comparison signal; and generate a third control signal indicating whether the power converter is unplugged from the voltage supply for the AC input voltage. In some examples, the second timer is further configured to receive the second comparison signal. In certain examples, the voltage detector further includes: a debouncing circuit configured to: receive the second comparison signal; and generate a processed signal based at least in part on the second comparison signal; wherein the second timer is further configured to receive the processed signal.

In some examples, the controller further includes a microcontroller unit configured to send the first control signal to the switch and receive the second control signal from the first timer and the third control signal from the second timer. In certain examples, the microcontroller unit is further configured to, if the first control signal is at the first logic level: cause the power converter to set the output power at the first power level if the second control signal indicates that the AC input voltage is determined to be in the first voltage state; and cause the power converter to set the output power at the second power level if the second control signal indicates that the AC input voltage is determined to be in the second voltage state; if the first control signal is at the second logic level: cause the power converter to send one or more notification signals to the one or more loads if the third control signal indicates that the power converter is unplugged from the voltage supply for the AC input voltage. In some examples, the voltage detector further includes: a third comparator configured to: receive a third threshold voltage and a detection voltage related to a third resistor; and generate a third comparison signal based at least in part on the third threshold voltage and the detection voltage.

In certain examples, the voltage detector further includes: a short-circuit detector configured to, if the switch is open by the first control signal: process information associated with the second comparison signal and the third comparison signal; determine whether the third resistor is short circuited based on at least information associated with the second comparison signal and the third comparison signal; and generate a fourth control signal indicating whether the third resistor is short circuited. In some examples, the second timer is further configured to receive the second comparison signal; and the short-circuit detector is further configured to receive the second comparison signal and the third comparison signal. In certain examples, the voltage detector further includes: a debouncing circuit configured to: receive the second comparison signal; and generate a processed signal based at least in part on the second comparison signal; wherein: the second timer is further configured to receive the processed signal; and the short-circuit detector is further configured to receive the processed signal and the third comparison signal.

In some examples, the short-circuit detector is further configured to, if the switch is open by the first control signal: determine a cycle frequency of the power converter based at least in part on the second comparison signal; determine whether the cycle frequency exceeds a predetermined frequency threshold; and if the cycle frequency exceeds the predetermined frequency threshold and the detection voltage is lower than the third threshold voltage, determine that the third resistor is short circuited; and generate the fourth control signal that indicates that the third resistor is short circuited. In certain examples, the controller further includes a microcontroller unit configured to send the first control signal to the switch and receive the second control signal from the first timer, the third control signal from the second timer, and the fourth control signal from the short-circuit detector. In some examples, the microcontroller unit is further configured to, if the first control signal is at the first logic level: cause the power converter to set the output power at the first power level if the second control signal indicates that the AC input voltage is determined to be in the first voltage state; and cause the power converter to set the output power at the second power level if the second control signal indicates that the AC input voltage is determined to be in the second voltage state; if the first control signal is at the second logic level: cause the power converter to send one or more notification signals to the one or more loads if the third control signal indicates that the power converter is unplugged from the voltage supply for the AC input voltage; and cause the power converter to reduce an output current to the one or more loads to zero if the fourth control signal indicates that the third resistor is short circuited.

According to certain embodiments, a method for charging one or more loads includes: receiving a first voltage related to a second voltage of a secondary winding of a power converter, the power converter further including a primary winding coupled to the secondary winding, the power converter being configured to, if the power converter is not unplugged from a voltage supply for an AC input voltage, receive the AC input voltage represented by the second voltage and output an output power to the one or more loads; processing information associated with the first voltage; determining whether the AC input voltage is in a first voltage state or in a second voltage state based at least in part on the first voltage; if the AC input voltage is determined to be in the first voltage state, causing the power converter to set the output power at a first power level; if the AC input voltage is determined in the second voltage state, causing the power converter to set the output power at a second power level; wherein: the first voltage state and the second voltage state are different; and the first power level and the second power level are different. For example, the method is implemented according to at least FIG. 3, FIG. 4, FIG. 5, FIG. 7, FIG. 8, FIG. 9, FIG. 10, and/or FIG. 12.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for charging one or more loads, the controller comprising:
 a controller terminal configured to be biased at a first voltage related to a second voltage of a secondary winding of a power converter, the power converter further including a primary winding coupled to the secondary winding, the power converter being configured to, with the power converter not being unplugged from a voltage supply for an AC input voltage, receive the AC input voltage represented by the second voltage and output an output power to the one or more loads; and
 a voltage detector configured to:
  process information associated with the first voltage; and
  generate two separate detection signals based at least in part on the first voltage, the two separate detection signals including a first detection signal and a second detection signal;
 wherein the voltage detector is further configured to:
  determine whether or not the power converter is unplugged from the voltage supply for the AC input voltage based at least in part on the first voltage; and
  generate the first detection signal indicating whether or not the power converter is unplugged from the voltage supply for the AC input voltage;
 wherein the voltage detector is further configured to:
  determine whether the AC input voltage is in a high-voltage state or in a low-voltage state based at least in part on the first voltage; and
  generate the second detection signal indicating whether the AC input voltage is in the high-voltage state or in the low-voltage state.

2. The controller of claim 1 wherein:
 in the high-voltage state, the AC input voltage corresponds to a high root mean square voltage value; and
 in the low-voltage state, the AC input voltage corresponds to a low root mean square voltage value;
 wherein the high root mean square voltage value is higher than the low root mean square voltage value.

3. The controller of claim 1 wherein the one or more loads include a device including one or more batteries to be charged by the power converter.

4. The controller of claim 1, and further comprising a microcontroller unit configured to send a control signal to the voltage detector and receive the first detection signal and the second detection signal from the voltage detector.

5. The controller of claim 4 wherein the microcontroller unit is further configured to, with the control signal being at a first logic level:
 cause the power converter to set the output power at a high power level, in response to the second detection signal indicating that the AC input voltage is in the high-voltage state; and
 cause the power converter to set the output power at a low power level, in response to the second detection signal indicating that the AC input voltage is in the low-voltage state;
 wherein the high power level is higher than the low power level.

6. The controller of claim 5 wherein:
 the microcontroller unit is further configured to, with the control signal being at a second logic level, cause the power converter to send one or more notification signals to the one or more loads, in response to the first detection signal indicating that the power converter is unplugged from the voltage supply for the AC input voltage; and
 the second logic level is different from the first logic level.

7. The controller of claim 6 wherein the voltage detector includes:
 a first resistor including a first resistor terminal and a second resistor terminal; and
 a switch including a first switch terminal and a second switch terminal;

wherein:
the first switch terminal is biased to a predetermined voltage;
the second switch terminal is coupled to the first resistor terminal; and
the second resistor terminal is coupled, through the controller terminal, to a third resistor terminal of a second resistor, the second resistor further including a fourth resistor terminal configured to receive the second voltage from the secondary winding.

8. The controller of claim 7 wherein the predetermined voltage is a ground voltage.

9. The controller of claim 7 wherein:
the switch is configured to receive the control signal;
wherein:
in response to the control signal being at the first logic level, the switch is closed; and
in response to the control signal being at the second logic level, the switch is open.

10. The controller of claim 9 wherein the voltage detector further includes a first comparator configured to:
receive a first threshold voltage and the first voltage; and
generate a first comparison signal based at least in part on the first threshold voltage and the first voltage.

11. The controller of claim 10 wherein the voltage detector further includes:
a first timer configured to receive the first comparison signal;
wherein, with the switch being closed by the control signal, the first timer is further configured to:
determine whether the AC input voltage is in the high-voltage state or in the low-voltage state based at least in part on the first comparison signal and a first predetermined time duration; and
generate the second detection signal indicating whether the AC input voltage is in the high-voltage state or in the low-voltage state.

12. The controller of claim 11 wherein the voltage detector further includes:
a clamper including a first clamper terminal and a second clamper terminal;
wherein:
the first clamper terminal is biased to the predetermined voltage; and
the second clamper terminal is coupled to the controller terminal and the second resistor terminal.

13. The controller of claim 12 wherein the clamper is configured to set a peak magnitude of the first voltage to a predetermined peak value.

14. The controller of claim 12 wherein the voltage detector further includes a second comparator configured to:
receive the first voltage and a second threshold voltage; and
generate a second comparison signal based at least in part on the first voltage and the second threshold voltage.

15. The controller of claim 14 wherein the voltage detector further includes:
a second timer configured to process information associated with the second comparison signal;
wherein, with the switch being open by the control signal, the second timer is further configured to:
determine whether or not the power converter is unplugged from the voltage supply for the AC input voltage based on at least information associated with the second comparison signal; and
generate the first detection signal indicating whether or not the power converter is unplugged from the voltage supply for the AC input voltage.

16. The controller of claim 15 wherein the second timer is further configured to receive the second comparison signal.

17. The controller of claim 15 wherein:
the voltage detector further includes a debouncing circuit configured to:
receive the second comparison signal; and
generate a processed signal based at least in part on the second comparison signal; and
the second timer is further configured to receive the processed signal.

18. A controller for charging one or more loads, the controller comprising:
a first controller terminal configured to be biased at a first voltage related to a second voltage of a secondary winding of a power converter, the power converter further including a primary winding coupled to the secondary winding, the power converter being configured to, with the power converter not being unplugged from a voltage supply for an AC input voltage, receive the AC input voltage represented by the second voltage and output an output power to the one or more loads;
a second controller terminal configured to be coupled to a first resistor terminal of a first resistor, the first resistor further including a second resistor terminal;
a third controller terminal configured to be coupled to the second resistor terminal of the first resistor; and
a voltage detector configured to:
generate a first detection signal based on at least information associated with the second controller terminal and the third controller terminal; and
generate a second detection signal based at least in part on the first voltage, the second detection and the first detection being two separate detection signals;
wherein the voltage detector is further configured to:
determine whether or not the first resistor is short circuited based on at least information associated with the second controller terminal and the third controller terminal; and
generate the first detection signal indicating whether or not the first resistor is short circuited;
wherein the voltage detector is further configured to:
determine whether the AC input voltage is in a high-voltage state or in a low-voltage state based at least in part on the first voltage; and
generate the second detection signal indicating whether the AC input voltage is in the high-voltage state or in the low-voltage state.

19. The controller of claim 18 wherein:
in the high-voltage state, the AC input voltage corresponds to a high root mean square voltage value; and
in the low-voltage state, the AC input voltage corresponds to a low root mean square voltage value;
wherein the high root mean square voltage value is higher than the low root mean square voltage value.

20. The controller of claim 18 wherein the one or more loads include a device including one or more batteries to be charged by the power converter.

21. The controller of claim 18, and further comprising a microcontroller unit configured to send a control signal to the voltage detector and receive the first detection signal and the second detection signal from the voltage detector.

22. The controller of claim 21 wherein the microcontroller unit is further configured to, with the control signal being at a first logic level:
cause the power converter to set the output power at a high power level, in response to the second detection signal indicating that the AC input voltage is in the high-voltage state; and
cause the power converter to set the output power at a low power level, in response to the second detection signal indicating that the AC input voltage is in the low-voltage state;
wherein the high power level is higher than the low power level.

23. The controller of claim 22 wherein:
the microcontroller unit is further configured to, with the control signal being at a second logic level, cause the power converter to reduce an output current to the one or more loads to zero, in response to the first detection signal indicating that the first resistor is short circuited; and
the second logic level is different from the first logic level.

24. The controller of claim 23 wherein the voltage detector includes:
a second resistor including a third resistor terminal and a fourth resistor terminal; and
a switch including a first switch terminal and a second switch terminal;
wherein:
the first switch terminal is biased to a predetermined voltage;
the second switch terminal is coupled to the third resistor terminal; and
the fourth resistor terminal is coupled, through the controller terminal, to a fifth resistor terminal of a third resistor, the third resistor further including a sixth resistor terminal configured to receive the second voltage from the secondary winding.

25. The controller of claim 24 wherein the predetermined voltage is a ground voltage.

26. The controller of claim 24 wherein:
the switch is configured to receive the control signal;
wherein:
in response to the control signal being at the first logic level, the switch is closed; and
in response to the control signal being at the second logic level, the switch is open.

27. The controller of claim 26 wherein the voltage detector further includes a first comparator configured to:
receive a first threshold voltage and the first voltage; and
generate a first comparison signal based at least in part on the first threshold voltage and the first voltage.

28. The controller of claim 27 wherein the voltage detector further includes:
a first timer configured to receive the first comparison signal;
wherein, with the switch being closed by the control signal, the first timer is further configured to:
determine whether the AC input voltage is in the high-voltage state or in the low-voltage state based at least in part on the first comparison signal and a first predetermined time duration; and
generate the second detection signal indicating whether the AC input voltage is in the high-voltage state or in the low-voltage state.

29. The controller of claim 28 wherein the voltage detector further includes:

a clamper including a first clamper terminal and a second clamper terminal;
wherein:
the first clamper terminal is biased to the predetermined voltage; and
the second clamper terminal is coupled to the controller terminal and the fourth resistor terminal.

30. The controller of claim 28 wherein the clamper is configured to set a peak magnitude of the first voltage to a predetermined peak value.

31. The controller of claim 28 wherein the voltage detector further includes:
a second comparator configured to receive the first voltage and a second threshold voltage; and
a third comparator configured to receive a third threshold voltage and a detection voltage related to the second controller terminal and the third controller terminal;
wherein:
the second comparator is further configured to generate a second comparison signal based at least in part on the first voltage and the second threshold voltage; and
the third comparator is further configured to generate a third comparison signal based at least in part on the third threshold voltage and the detection voltage.

32. The controller of claim 31 wherein the voltage detector further includes:
a short-circuit detector configured to process information associated with the second comparison signal and the third comparison signal;
wherein the short-circuit detector is further configured to, with the switch being open by the control signal:
determine whether or not the first resistor is short circuited based on at least information associated with the second comparison signal and the third comparison signal; and
generate the first detection signal indicating whether or not the first resistor is short circuited.

33. The controller of claim 32 wherein the short-circuit detector is further configured to receive the second comparison signal and the third comparison signal.

34. The controller of claim 32 wherein:
the voltage detector further includes a debouncing circuit configured to:
receive the second comparison signal; and
generate a processed signal based at least in part on the second comparison signal; and
the short-circuit detector is further configured to receive the processed signal and the third comparison signal.

35. The controller of claim 32 wherein the short-circuit detector is further configured to, with the switch being open by the control signal:
determine a cycle frequency of the power converter based on at least information associated with the second comparison signal;
compare the cycle frequency with a predetermined frequency threshold; and
in response to the cycle frequency exceeding the predetermined frequency threshold and the detection voltage being lower than the third threshold voltage,
determine that the first resistor is short circuited; and
generate the first detection signal indicating that the first resistor is short circuited.

36. The controller of claim 32 wherein the short-circuit detector is further configured to, with the switch being open by the control signal:

determine a cycle frequency of the power converter based on at least information associated with the second comparison signal;
compare the cycle frequency with a predetermined frequency threshold; and
in response to the cycle frequency being lower than the predetermined frequency threshold,
determine that the first resistor is not short circuited; and
generate the first detection signal indicating that the first resistor is not short circuited.

37. The controller of claim 32 wherein the short-circuit detector is further configured to, with the switch being open by the control signal:
in response to the detection voltage being higher than the third threshold voltage, determine that the first resistor is not short circuited; and
generate the first detection signal indicating that the first resistor is not short circuited.

38. A controller for charging one or more loads, the controller comprising:
a first controller terminal configured to be biased at a first voltage related to a second voltage of a secondary winding of a power converter, the power converter further including a primary winding coupled to the secondary winding, the power converter being configured to, with the power converter not being unplugged from a voltage supply for an AC input voltage, receive the AC input voltage represented by the second voltage and output an output power to the one or more loads;
a second controller terminal configured to be coupled to a first resistor terminal of a first resistor, the first resistor further including a second resistor terminal;
a third controller terminal configured to be coupled to the second resistor terminal of the first resistor; and
a voltage detector configured to:
generate a first detection signal based on at least information associated with the second controller terminal and the third controller terminal; and
generate a second detection signal and a third detection signal based at least in part on the first voltage;
wherein the voltage detector is further configured to:
determine whether or not the first resistor is short circuited based on at least information associated with the second controller terminal and the third controller terminal; and
generate the first detection signal indicating whether or not the first resistor is short circuited;
wherein the voltage detector is further configured to:
determine whether the AC input voltage is in a high-voltage state or in a low-voltage state based at least in part on the first voltage; and
generate the second detection signal indicating whether the AC input voltage is in the high-voltage state or in the low-voltage state;
wherein the voltage detector is further configured to:
determine whether or not the power converter is unplugged from the voltage supply for the AC input voltage based at least in part on the first voltage; and
generate the third detection signal indicating whether or not the power converter is unplugged from the voltage supply for the AC input voltage;
wherein the first detection signal, the second detection signal, and the third detection signal are three separate detection signals.

39. The controller of claim 38 wherein:
in the high-voltage state, the AC input voltage corresponds to a high root mean square voltage value; and
in the low-voltage state, the AC input voltage corresponds to a low root mean square voltage value;
wherein the high root mean square voltage value is higher than the low root mean square voltage value.

40. The controller of claim 38 wherein the one or more loads include a device including one or more batteries to be charged by the power converter.

41. The controller of claim 38, and further comprising a microcontroller unit configured to send a control signal to the voltage detector and receive the first detection signal, the second detection signal, and the third detection from the voltage detector.

42. The controller of claim 41 wherein the microcontroller unit is further configured to, with the control signal being at a first logic level:
cause the power converter to set the output power at a high power level, in response to the second detection signal indicating that the AC input voltage is in the high-voltage state; and
cause the power converter to set the output power at a low power level, in response to the second detection signal indicating that the AC input voltage is in the low-voltage state;
wherein the high power level is higher than the low power level.

43. The controller of claim 42 wherein:
the microcontroller unit is further configured to, with the control signal being at a second logic level, cause the power converter to reduce an output current to the one or more loads to zero, in response to the first detection signal indicating that the first resistor is short circuited; and
the second logic level is different from the first logic level.

44. The controller of claim 43 wherein:
the microcontroller unit is further configured to, with the control signal being at the second logic level, cause the power converter to send one or more notification signals to the one or more loads, in response to the third detection signal indicating that the power converter being unplugged from the voltage supply for the AC input voltage.

* * * * *